US012117238B2

(12) United States Patent
Jacob

(10) Patent No.: US 12,117,238 B2
(45) Date of Patent: Oct. 15, 2024

(54) MULTI-FUNCTION COOLER

(71) Applicant: Brumate, Inc., Dover, DE (US)

(72) Inventor: Dylan M. Jacob, Denver, CO (US)

(73) Assignee: Brumate, Inc., Denver, CO (US)

( * ) Notice: Subject to any disclaimer, the term of this patent is extended or adjusted under 35 U.S.C. 154(b) by 0 days.

(21) Appl. No.: 17/985,592

(22) Filed: Nov. 11, 2022

(65) Prior Publication Data

US 2023/0213263 A1 Jul. 6, 2023

Related U.S. Application Data

(63) Continuation of application No. 17/647,129, filed on Jan. 5, 2022.

(51) Int. Cl.

| | |
|---|---|
| ***F25D 3/08*** | (2006.01) |
| ***A45C 11/20*** | (2006.01) |
| ***A45C 13/02*** | (2006.01) |
| ***B65D 81/38*** | (2006.01) |
| ***B67D 3/00*** | (2006.01) |
| ***B67D 3/04*** | (2006.01) |
| ***F25D 3/06*** | (2006.01) |
| ***F25D 23/02*** | (2006.01) |
| ***F25D 31/00*** | (2006.01) |

(52) U.S. Cl.
CPC ................ *F25D 3/08* (2013.01); *A45C 11/20* (2013.01); *A45C 13/02* (2013.01); *B65D 81/3825* (2013.01); *B67D 3/0009* (2013.01); *B67D 3/043* (2013.01); *F25D 3/06* (2013.01); *F25D 23/028* (2013.01); *F25D 31/002* (2013.01); *A45C 2013/026* (2013.01); *B67D 2210/00133* (2013.01); *F25D 2331/806* (2013.01)

(58) Field of Classification Search
CPC . F25D 3/08; F25D 3/06; F25D 23/028; F25D 31/002; F25D 2331/806; A45C 11/20; A45C 13/02; A45C 2013/026; B65D 81/3825; B67D 3/043; B67D 2210/00133; B67D 3/0009
See application file for complete search history.

(56) References Cited

U.S. PATENT DOCUMENTS

| | | | | |
|---|---|---|---|---|
| 147,924 A | | 2/1874 | Fink | |
| 1,019,416 A | | 3/1912 | Bonnell | |
| 1,176,653 A | * | 3/1916 | Chow .................. | B65D 47/061 222/509 |
| 2,291,256 A | * | 7/1942 | Rehrig .................. | A47J 41/005 62/395 |
| 3,111,014 A | | 11/1963 | Herrick | |

(Continued)

OTHER PUBLICATIONS

Jacob, D., "Sneak-peek at one of the final BruTank samples", BruMate VIP Group, p. 1 (Jul. 22, 2021).

(Continued)

*Primary Examiner* — Frederick C Nicolas
(74) *Attorney, Agent, or Firm* — Shook, Hardy & Bacon L.L.P.

(57) ABSTRACT

An insulated container having an internal chamber, a second container received within the internal chamber, a spigot assembly extending through a passageway through a wall of the insulated container and removably coupled to the second container, the spigot assembly being in fluid communication with the second container for dispensing liquid out of the insulated container.

20 Claims, 28 Drawing Sheets

(56) References Cited

U.S. PATENT DOCUMENTS 3,152,729 A 10/1964 Piker
3,387,749 A 6/1968 Godshalk et al.
3,395,550 A * 8/1968 Dungan .................... F25D 3/08 62/464
3,613,872 A * 10/1971 Donnelly ........... B65D 81/3823 206/547
3,782,602 A * 1/1974 Page ...................... B65D 25/38 222/509
4,071,160 A * 1/1978 Vick ......................... F25D 3/08 220/592.2
4,143,695 A 3/1979 Hoehn
4,162,029 A 7/1979 Gottsegen et al.
4,195,757 A * 4/1980 Jefferson .................... B62J 7/04 220/555
4,204,613 A * 5/1980 Terzian ................ B67D 3/0009 165/169
4,577,475 A * 3/1986 Herrera .................. A45C 11/20 62/464
4,771,917 A 9/1988 Heaps et al.
4,775,072 A * 10/1988 Lundblade ............. A45C 13/26 220/766
4,873,841 A 10/1989 Bradshaw et al.
4,974,903 A 12/1990 Lipschitz et al.
5,048,705 A 9/1991 Lynd et al.
5,222,631 A 6/1993 Hood
5,242,079 A 9/1993 Stephens et al.
5,301,601 A 4/1994 Cretors
5,329,787 A * 7/1994 Friday ....................... F25D 3/08 62/530
D353,304 S * 12/1994 Friedrich ....................... D7/605
5,431,205 A 7/1995 Gebhard
5,433,085 A 7/1995 Rogers
5,551,558 A * 9/1996 Bureau ..................... B62B 1/20 312/258
5,586,690 A 12/1996 Ettore et al.
5,596,880 A 1/1997 Welker et al.
5,680,959 A 10/1997 Ettore et al.
5,911,403 A 6/1999 Decler et al.
6,176,387 B1 * 1/2001 Boler ........................ F25D 3/06 220/23.88
6,286,700 B1 9/2001 Davidson
6,363,740 B1 4/2002 Hansen
6,783,034 B1 * 8/2004 Brent ................... B67D 1/0418 222/325
7,140,520 B1 11/2006 Rutler
7,237,696 B2 7/2007 Magermans et al.
7,246,727 B2 7/2007 Magermans et al.
7,690,537 B2 4/2010 Yates et al.
D655,124 S * 3/2012 Schenk .......................... D7/307
8,256,242 B1 * 9/2012 Evans .................... A45C 11/20 62/457.7
8,740,010 B1 * 6/2014 Page ...................... A45C 11/20 220/592.2
8,752,734 B2 6/2014 Smith et al.
8,887,959 B2 11/2014 Hill et al.
9,353,982 B2 * 5/2016 Sassman ............ B65D 81/3806
9,476,638 B1 * 10/2016 Tyler ........................ A45C 5/14
9,499,386 B2 11/2016 Malinski
9,676,522 B1 * 6/2017 Stovall ............... B65D 25/2826
9,835,367 B2 * 12/2017 Vanderberg ............... F25D 3/08
10,151,520 B2 * 12/2018 Christensen .............. B62B 1/16
10,272,934 B2 * 4/2019 DeFrancia ................ B62B 1/12
10,760,847 B2 9/2020 Goodloe
2002/0095947 A1 * 7/2002 Treppedi ................. B62B 13/18 62/457.3
2003/0139169 A1 * 7/2003 Arreazola, Jr. ........ H04B 1/086 455/344
2005/0023292 A1 2/2005 Market et al.
2006/0113317 A1 * 6/2006 Tolbert ................... A45C 11/20 222/78
2007/0001409 A1 * 1/2007 Kaplan .................... A45C 9/00 220/592.2
2007/0045339 A1 3/2007 Manion
2007/0056296 A1 3/2007 Gagliano
2007/0101754 A1 * 5/2007 Maldonado .......... B67D 3/0067 220/592.03
2007/0187435 A1 * 8/2007 Quirk ................... B67D 3/0083 222/481
2007/0277547 A1 * 12/2007 Veeravagu ........... B67D 3/0009 62/457.3
2008/0178629 A1 7/2008 Meether
2008/0237260 A1 * 10/2008 Wolek .................. B67D 3/0009 222/105
2009/0057339 A1 3/2009 Piscotty et al.
2009/0078721 A1 3/2009 Hoffman et al.
2009/0126394 A1 5/2009 Krog
2009/0173737 A1 7/2009 Ramsey et al.
2009/0241584 A1 * 10/2009 Hayes .................. B67D 3/0009 222/1
2010/0155437 A1 6/2010 Broadbent et al.
2010/0199711 A1 * 8/2010 Smith .................... A45C 11/20 224/257
2010/0212351 A1 8/2010 Chapin et al.
2012/0305595 A1 12/2012 Braun et al.
2013/0233890 A1 9/2013 Melzer
2013/0333767 A1 12/2013 Schmidt
2014/0252010 A1 9/2014 Miller
2015/0048118 A1 2/2015 English et al.
2015/0284138 A1 10/2015 Lane et al.
2015/0300730 A1 10/2015 Diaco et al.
2015/0375918 A1 * 12/2015 Holderness .......... B67D 3/0067 220/592.2
2016/0338507 A1 * 11/2016 Morrow ................ F25D 31/008
2017/0101301 A1 * 4/2017 Volin .................... F25D 31/006
2018/0003425 A1 1/2018 Goodloe
2018/0186547 A1 7/2018 Morine et al.
2018/0274837 A1 * 9/2018 Christensen ............ B62B 5/067
2018/0334287 A1 11/2018 Schaefer et al.
2019/0152677 A1 5/2019 Hoyt
2019/0234671 A1 8/2019 Stanford et al.
2020/0242585 A1 * 7/2020 Meere .................. G06Q 20/204
2021/0284426 A1 9/2021 Kalajyan et al.
2022/0170683 A1 6/2022 Jacob
2022/0289462 A1 * 9/2022 Papera ............... B65D 81/3813
2022/0412633 A1 * 12/2022 Ardoin .................... B62B 3/104
2023/0090955 A1 3/2023 Endrizzi

OTHER PUBLICATIONS

Jacob, D., "Something Big is coming this summer!", BruMate VIP Group, p. 1 (Jan. 5, 2021).
Invitation to pay additional fees received for PCT Patent Application No. PCT/US2023/010209, mailed on Mar. 30, 2023, 3 pages.
Non-Final Office Action dated Apr. 18, 2023 in U.S. Appl. No. 17/647,129, 8 pages.
International Search Report and Written Opinion received for PCT Patent Application No. PCT/US2023/010209, mailed on Jun. 22, 2023, 19 pages.
Notice of Allowance dated Aug. 23, 2023 in U.S. Appl. No. 17/985,575, 10 pages.
Final Office Action dated Nov. 7, 2023 in U.S. Appl. No. 17/647,129, 7 pages.
Non-Final Office Action received for U.S. Appl. No. 17/647,129, mailed on Jan. 19, 2024, 6 pages.
Non-Final Office Action received for U.S. Appl. No. 17/647,129, mailed on May 24, 2024, 6 pages.

* cited by examiner

MULTI-FUNCTION COOLER

CROSS-REFERENCE TO RELATED APPLICATIONS

This application is a continuation of U.S. application Ser. No. 17/647,129, filed Jan. 5, 2022, and entitled "Multi-Function Cooler." The entirety of the aforementioned application is hereby incorporated herein by reference.

FIELD

Aspects provided herein relate to insulating devices and, more particularly, coolers and/or ice chests.

BACKGROUND

Insulating containers or devices include an internal compartment intended to be maintained at a temperature different from an external, ambient temperature of an environment. Thus, the insulating containers or devices are configured to reduce a rate of heat transfer through one or more surfaces. Access to items present in the internal compartment is typically made by exposing the internal compartment to the external environment (e.g., by separating a lid structure from a base structure), which negatively impacts the ability to maintain the temperature of the internal compartment.

SUMMARY

At a high level, a cooler may include a lid structure coupled to a base structure to define an interior volume when in a closed position, a liquid container may be coupled to the cooler within the interior volume, and a spigot may pass through an opening in the base structure and be coupled to the liquid container such that the spigot is in fluid communication with the liquid container and may communicate a liquid held in the liquid container out of the cooler without moving the lid structure out of the closed position (e.g., without opening the cooler).

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
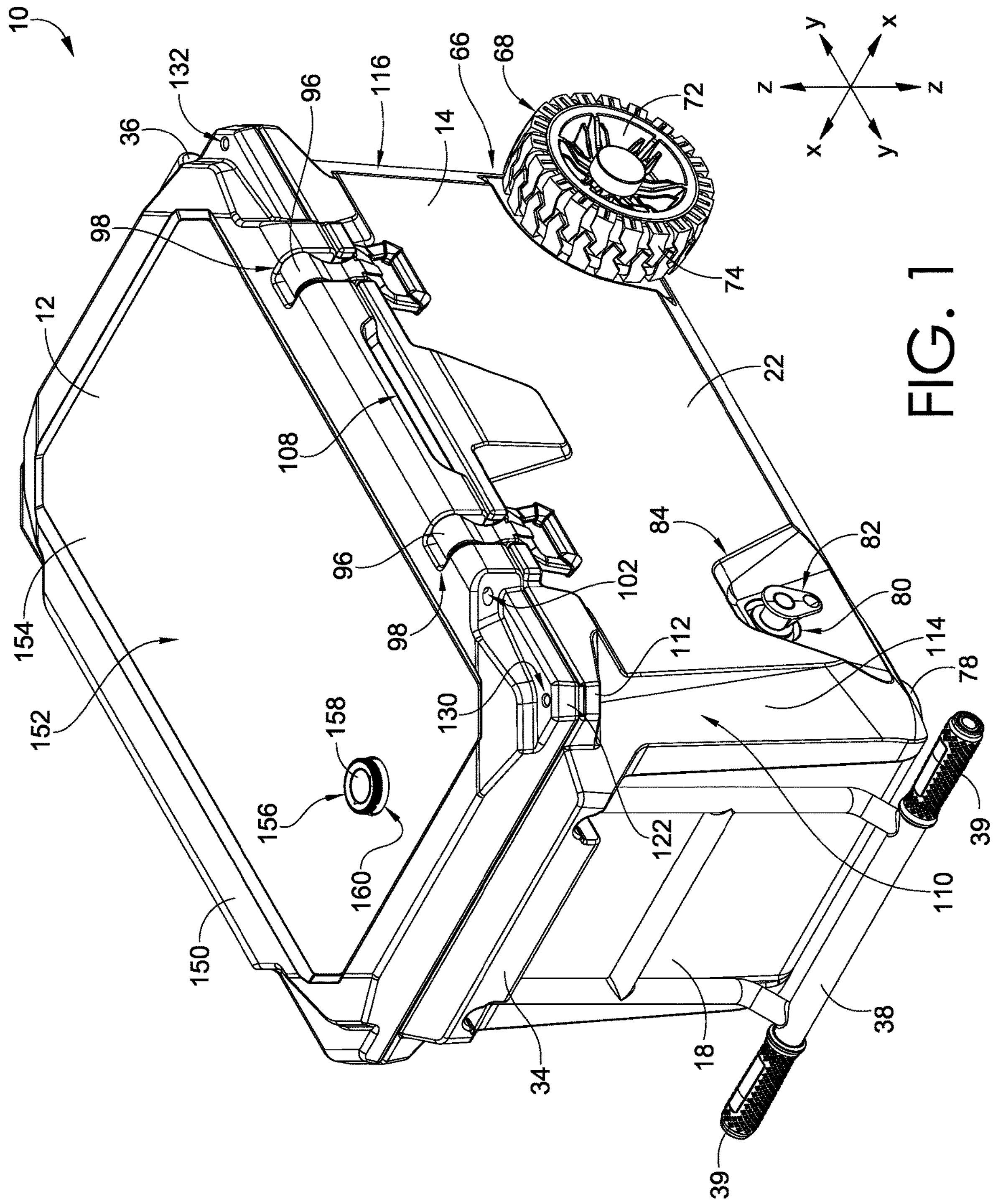
FIG. 1 depicts a perspective view of an insulated container with a lid structure in a closed configuration, in accordance with aspects hereof.

The subject matter of embodiments of the present invention is described with specificity herein to meet statutory requirements. However, the description itself is not intended to limit the scope of this patent. Rather, the inventor(s) have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

At a high level, a cooler may include a lid structure coupled to a base structure to define an interior volume when the lid structure is in a closed position, a liquid container may be coupled to the cooler within the interior volume, and a spigot may pass through an opening in the base structure and be coupled to the liquid container such that the spigot is in fluid communication with the liquid container and may communicate a liquid held in the liquid container out of the cooler without moving the lid structure out of the closed position (e.g., without opening the cooler).

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "vertical" and "vertically" as used herein refer to a direction perpendicular to each of the lateral and longitudinal axes.

Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

Turning now to the figures generally, and in particular to FIG. 1, an insulated container 10 is depicted having a lid structure 12 coupled to a base structure 14. The base structure 14 may include a bottom wall 16 (seen in FIGS. 4 and 5) substantially in an X-Y plane (lateral and longitudinal plane), a left wall 18 extending vertically from a left side of the bottom wall 16 substantially in the X-Z plane, a right wall 20 (seen in FIGS. 2 and 7) extending vertically from a right side of the bottom wall 16 substantially in the X-Z plane and positioned longitudinally opposite the left wall 18, a front wall 22 extending vertically from a front side of the bottom wall 16 substantially in the Y-Z plane and joined to the left wall 18 and the right wall 20, and a rear wall 24 (seen in FIGS. 2 and 8) extending vertically from a rear side of the bottom wall 16 substantially in the Y-Z plane and joined wo the left wall 18 and the right wall 20.

For ease of reference, axes X, Y, and Z are depicted in FIG. 1. Axis X, corresponding to the lateral direction extends in a direction substantially normal to the front wall 22 and the rear wall 24. Axis Y, corresponding to the longitudinal direction, extends in a direction substantially normal to the left wall 18 and the right wall 20. Axis Z, corresponding to the vertical direction, extends in a direction substantially normal to the bottom wall 16 and the lid structure 12 top surface.

In other aspects, the insulated container 10 may comprise more walls or fewer walls than those shown in FIGS. 1-9, such that the insulated container may comprise any geometric or irregular shape. Further, the walls may be formed together as a unitary structure or joined together in a customary fashion (e.g., bonding, welding, fastening, etc.).

Figure 2:
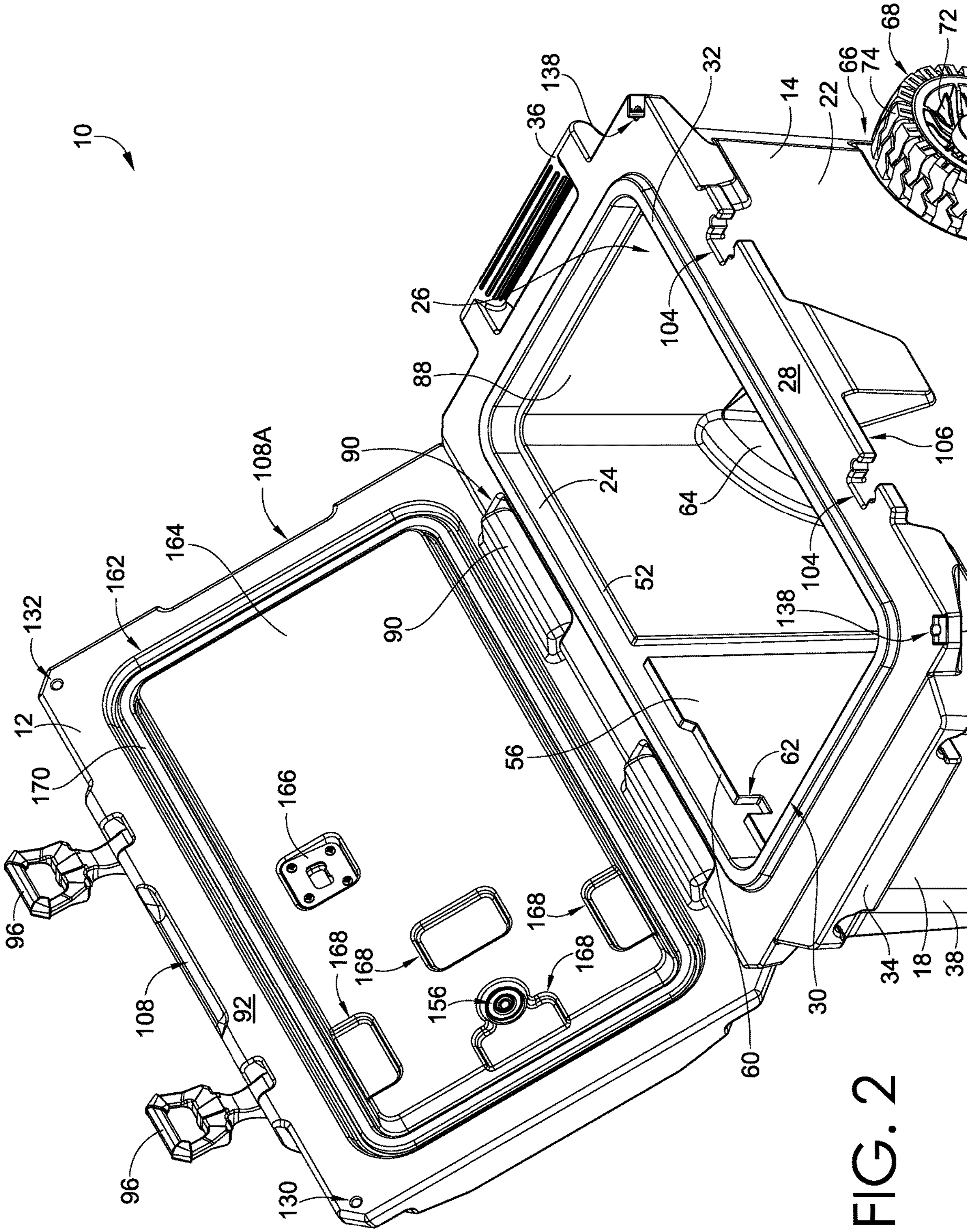
FIG. 2 depicts a perspective view of the insulated container of FIG. 1 with the lid structure in an open configuration, in accordance with aspects hereof.
Figure 3:
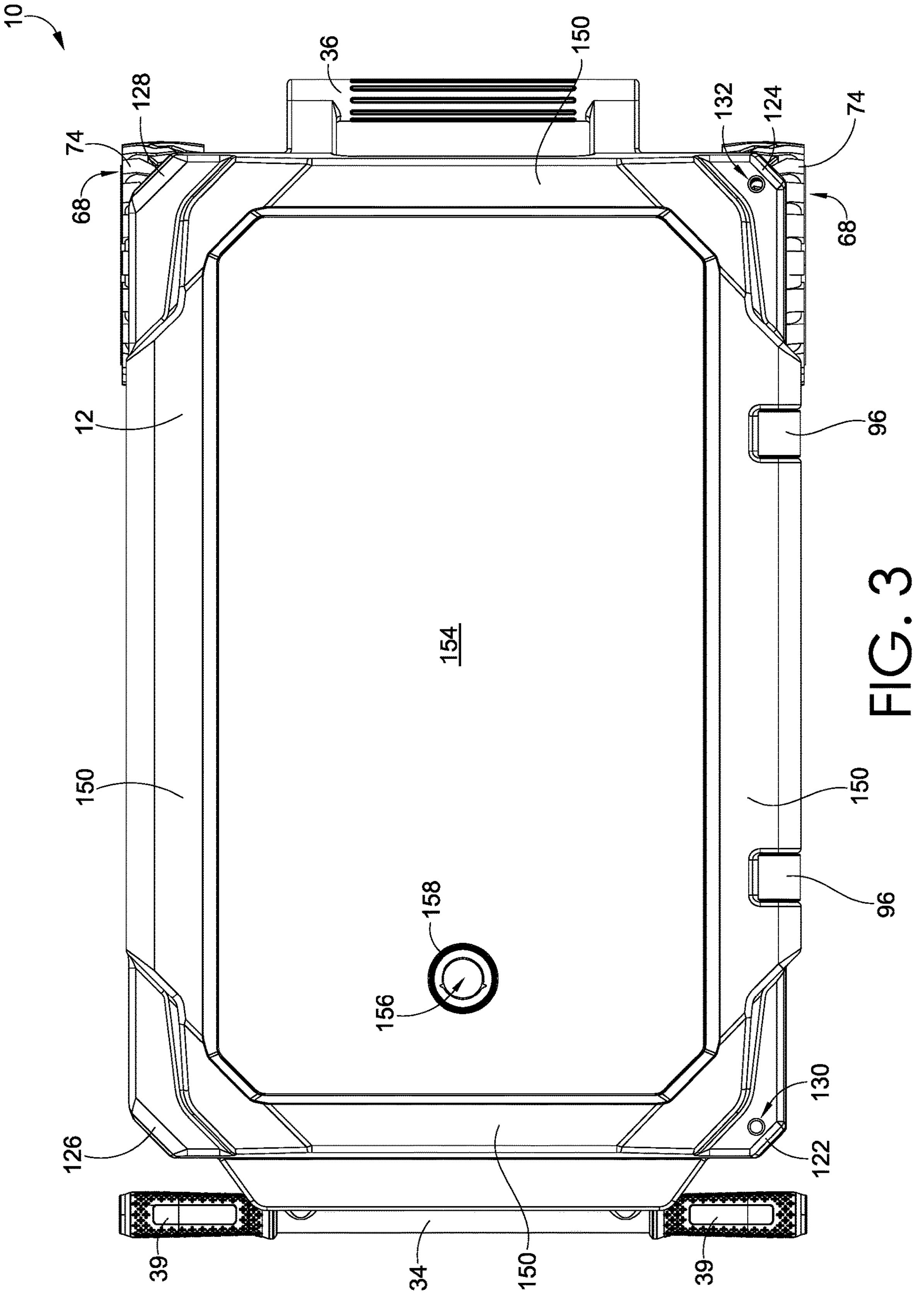
FIG. 3 depicts a top view of the insulated container of FIG. 1 with the lid structure in the closed configuration, in accordance with aspects hereof.

Referring to FIG. 2, the bottom wall 16, the left wall 18, the right wall 20, the front wall 22 and the rear wall 24 define an internal chamber 26 of the base structure 14. Atop each of the left wall 18, the right wall 20, the front wall 22 and the rear wall 24 is a planar surface 28 that extends around a perimeter of an opening 30 to the internal chamber 26. Along an inner edge of the planar surface 28 is a raised brim 32 extending in a vertical direction away from the planar surface 28. The raised brim 32 may be configured to interact with a sealing member 170 coupled to the lid structure 12, as described in more detail below.

The walls may provide insulation to the internal chamber 26 through conventional means. For example, the walls may be comprised of a solid material providing a thermal barrier. In other aspects, the walls may comprise a variety of solid and/or hollow layers. For example, the walls may include an inner wall structure separated from an outer wall structure by a fluid chamber (e.g., a gas or liquid filled volume, or a vacuum, between the inner and outer wall structures), one or more insulating layers of material (e.g., foam), or any combination thereof. The walls may be formed from any suitable material, such as a metal, a polymer, a wood, a ceramic, a textile fabric (e.g., a woven or non-woven material), or a combination of one or more such materials.

A left handle 34 may extend from the left wall 18 and a right handle 36 may extend from the right wall 20. Each of the handles may extend from an exterior side of the respective walls and are configured to enable lifting and/or carrying of the insulated container 10. In the illustrated aspect, these handles are integrated into the base structure 14. In other aspects, they may joined to the base structure 14 by other means (e.g., bonding, welding, affixing, fastening, etc.). Likewise, other features discussed herein may also be integrated into the base structure 14 or the lid structure 12 or such feature may be joined thereto by such other means.

Referring to FIG. 1, a pull bar 38 is pivotally coupled to the left wall 18. The pull bar 38 is configured to rotate between a stowed position (as shown in FIG. 1) and a pull position (not shown) and enable movement of the insulated container 10 without having to lift it. In some aspects, the pull bar 38 may be affixed on its proximal end to a pin (seen in FIG. 5) that extends through the left handle 34. In the illustrated aspect, a distal end of the pull bar 38 includes a pair of grip portions 39. Likewise, the right handle 36 includes a surface treatment that improves grip when grasping said handle (seen in FIG. 2).

Figure 4:
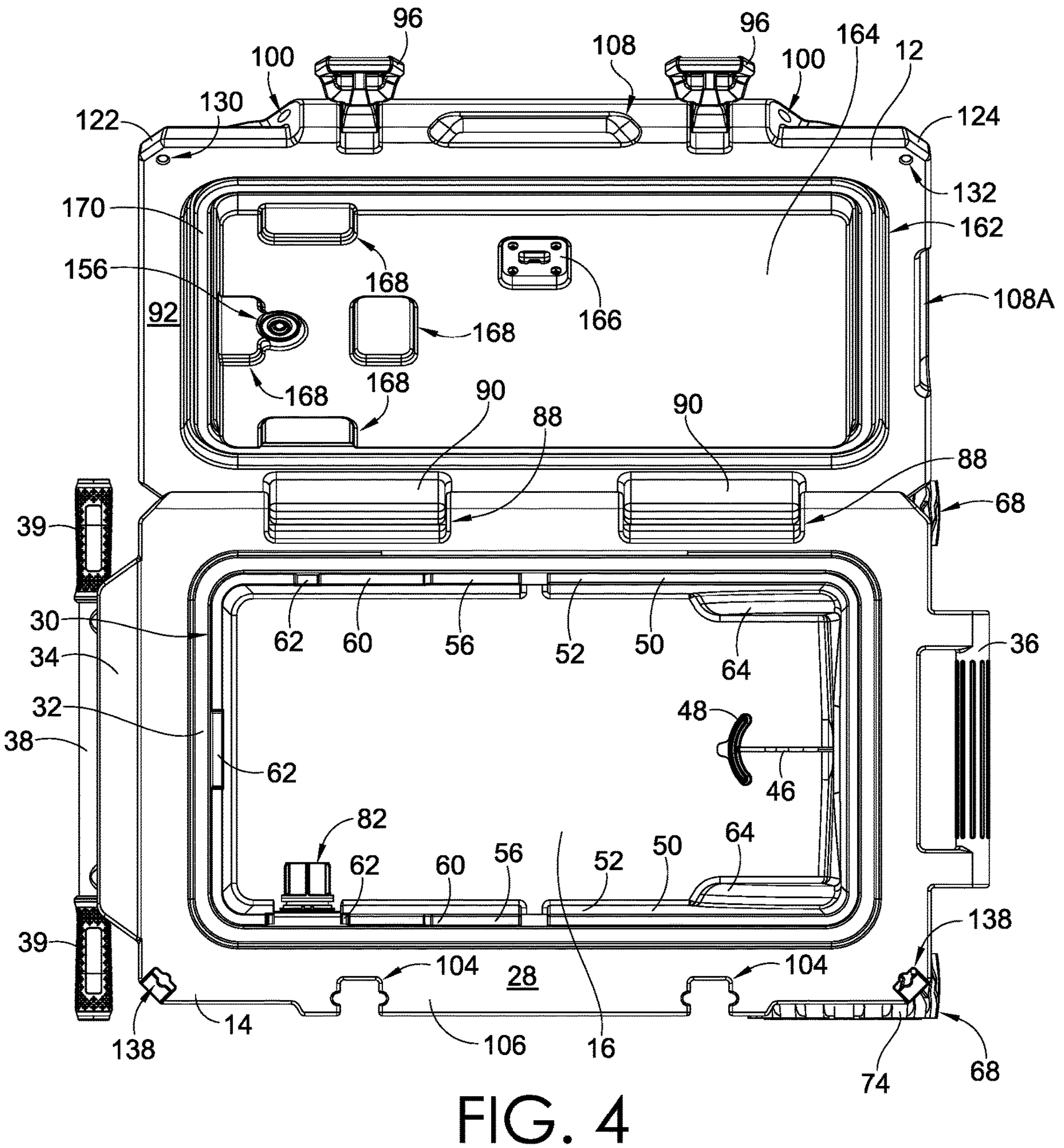
FIG. 4 depicts a top view of the insulated container of FIG. 1 with the lid structure in the open configuration, in accordance with aspects hereof.
Figure 7:
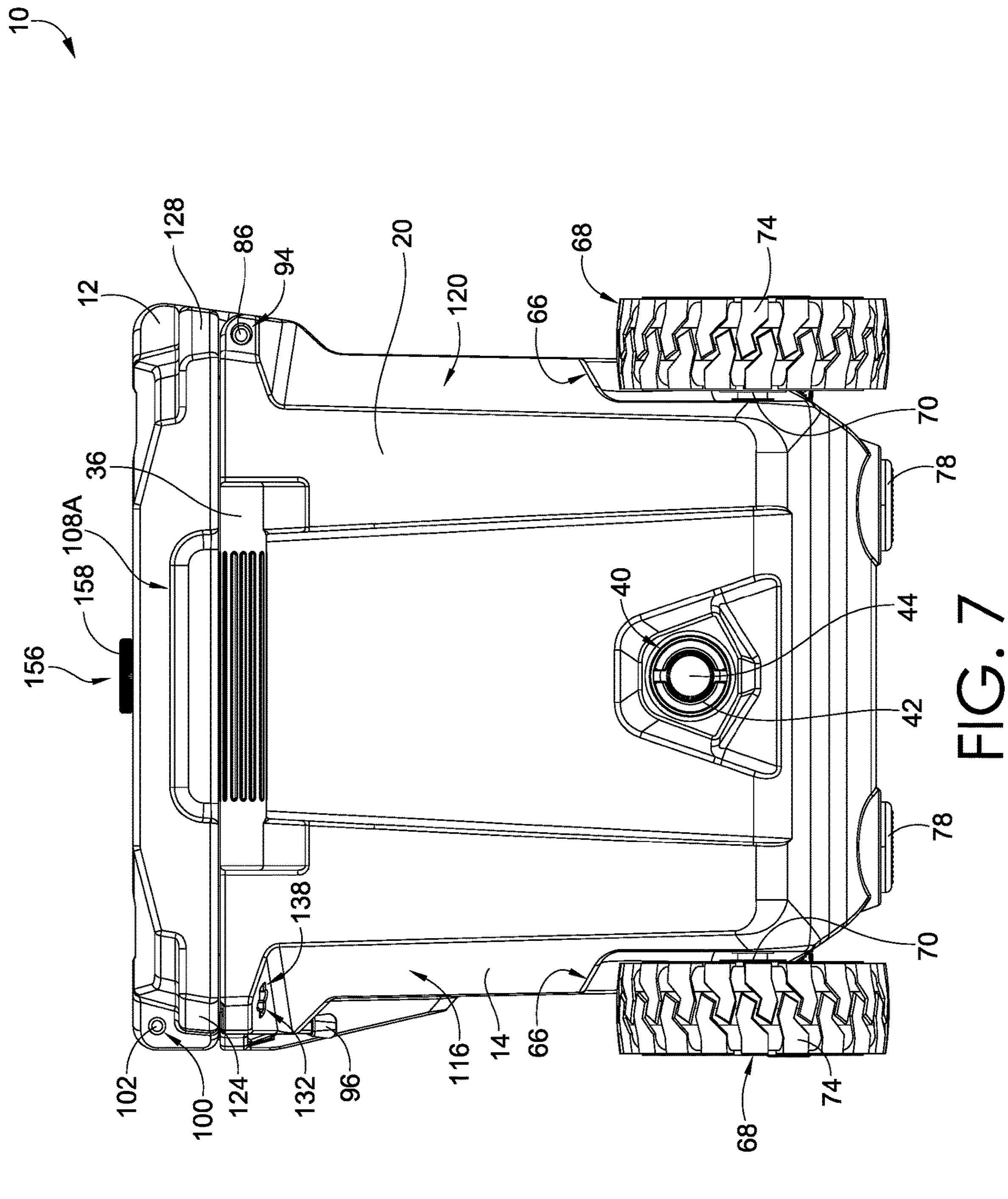
FIG. 7 depicts a right side elevation view of the insulated container of FIG. 1 with the lid structure in the closed configuration, in accordance with aspects hereof.
Figure 8:
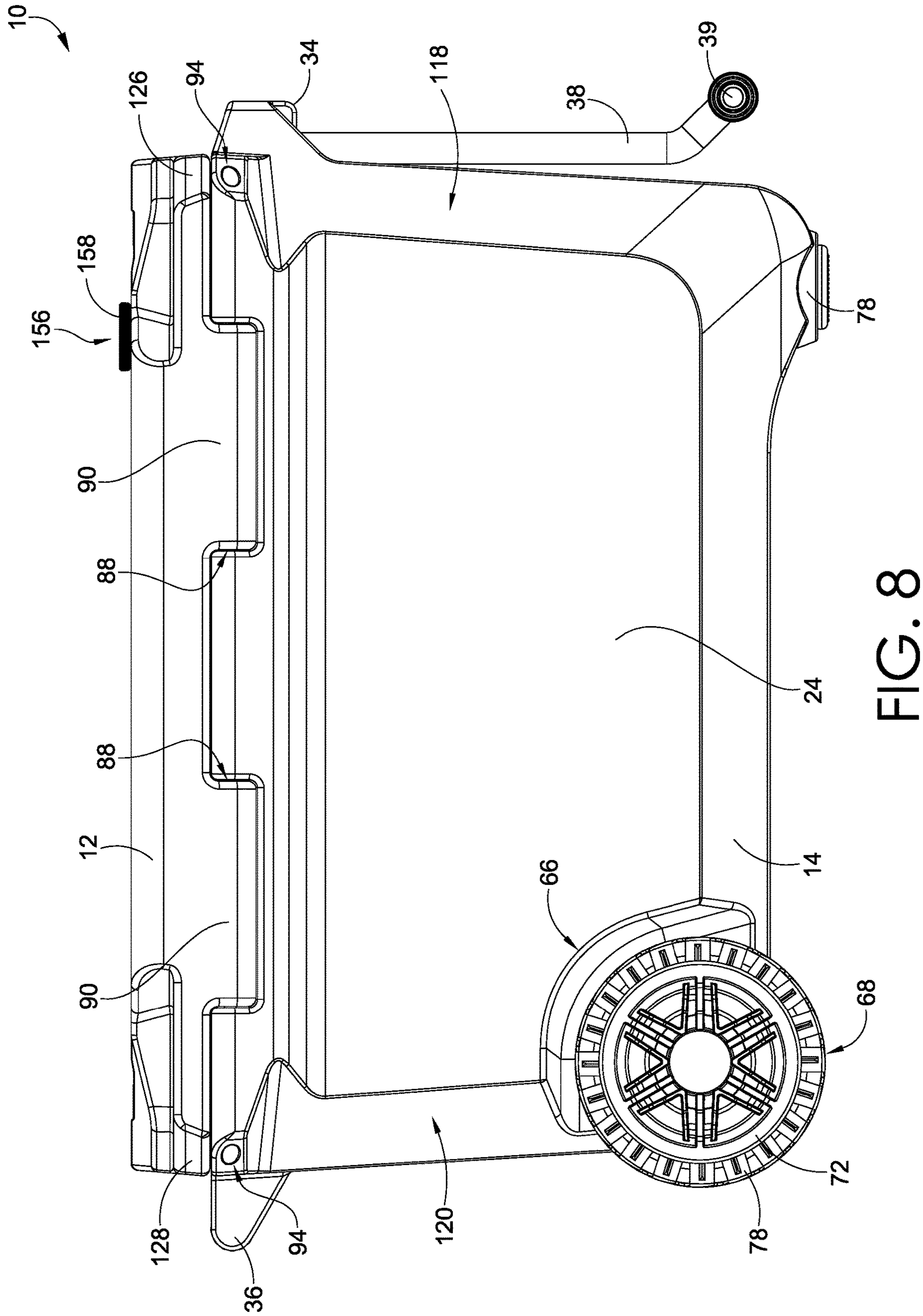
FIG. 8 depicts a rear elevation view of the insulated container of FIG. 1 with the lid structure in the closed configuration, in accordance with aspects hereof.
Figure 9:
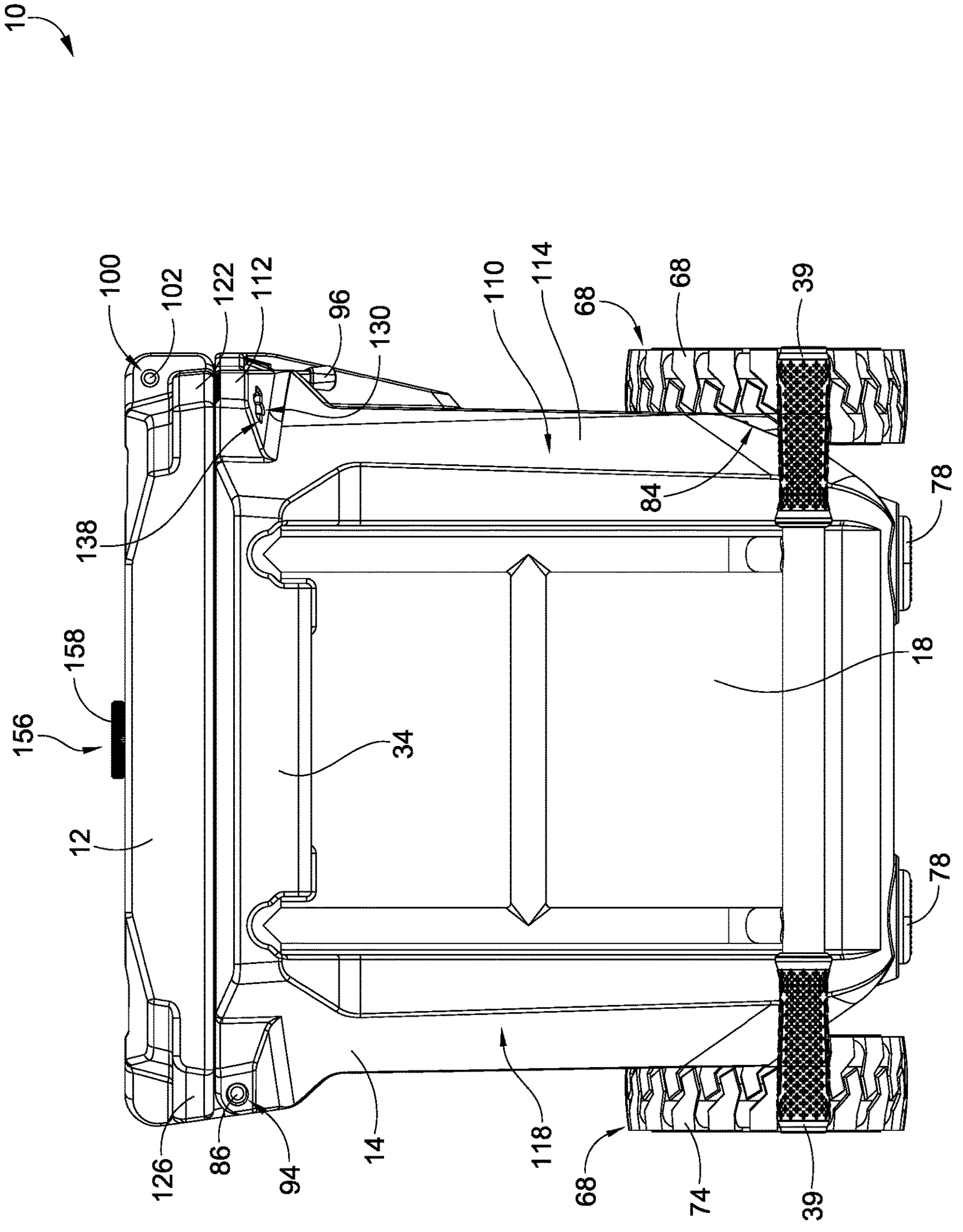
FIG. 9 depicts a left side elevation view of the insulated container of FIG. 1 with the lid structure in the closed configuration, in accordance with aspects hereof.

Turning to FIGS. 4 and 7, a drain port 40 may be formed through the right wall 20 and is configured to communicate fluid (e.g., water from melted ice, cleaning liquids, etc.) out of the internal chamber 26. Although shown on the right wall 20, the drain port 40 may be formed through any of the walls of the base structure 14. The drain port 40 may include threading to receive a threaded bushing 42. The threaded bushing 42 may receive a plug 44 in an internal passageway. The plug 44 may also comprise a keeper 46 that extends away from an internal side of the plug 44 into the internal chamber 26. The keeper 46 may terminate in a retaining portion 48. In operation, the keeper 46 may allow the plug 44 to slide out of the threaded bushing 42 a fixed distance before the retaining portion 48 prevents further movement. For example, the retaining portion 48 may have a larger diameter than the drain port 40. In some aspects, the keeper 46 may be made from a flexible material such that the keeper 46 and the retaining portion 48 may be manipulated to an orientation that fits through the drain port 40.

Figure 10:
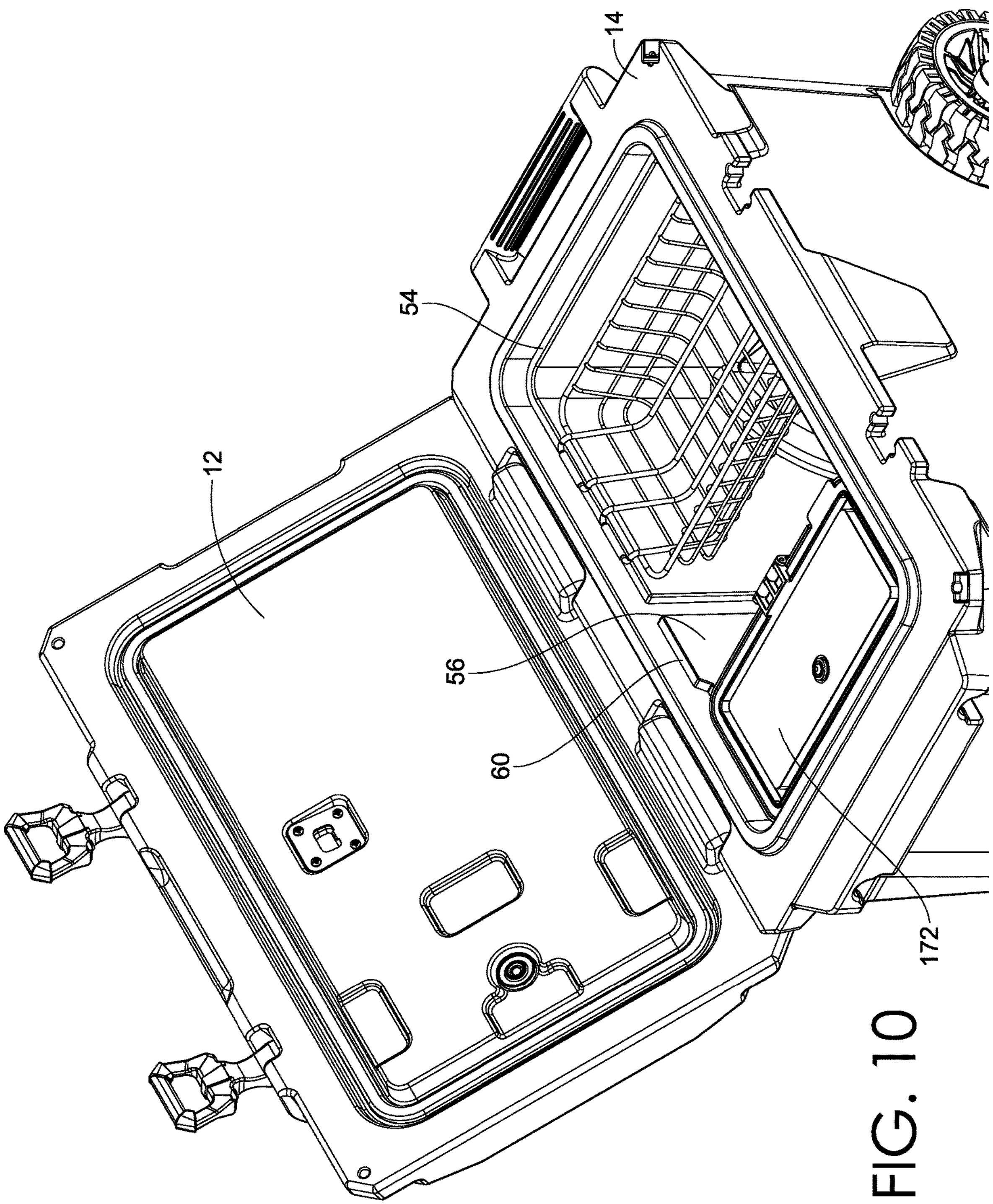
FIG. 10 depicts a perspective view of the insulated container of FIG. 1 with the lid structure in an open configuration and including accessories received in an internal chamber, in accordance with aspects hereof.
Figure 11:
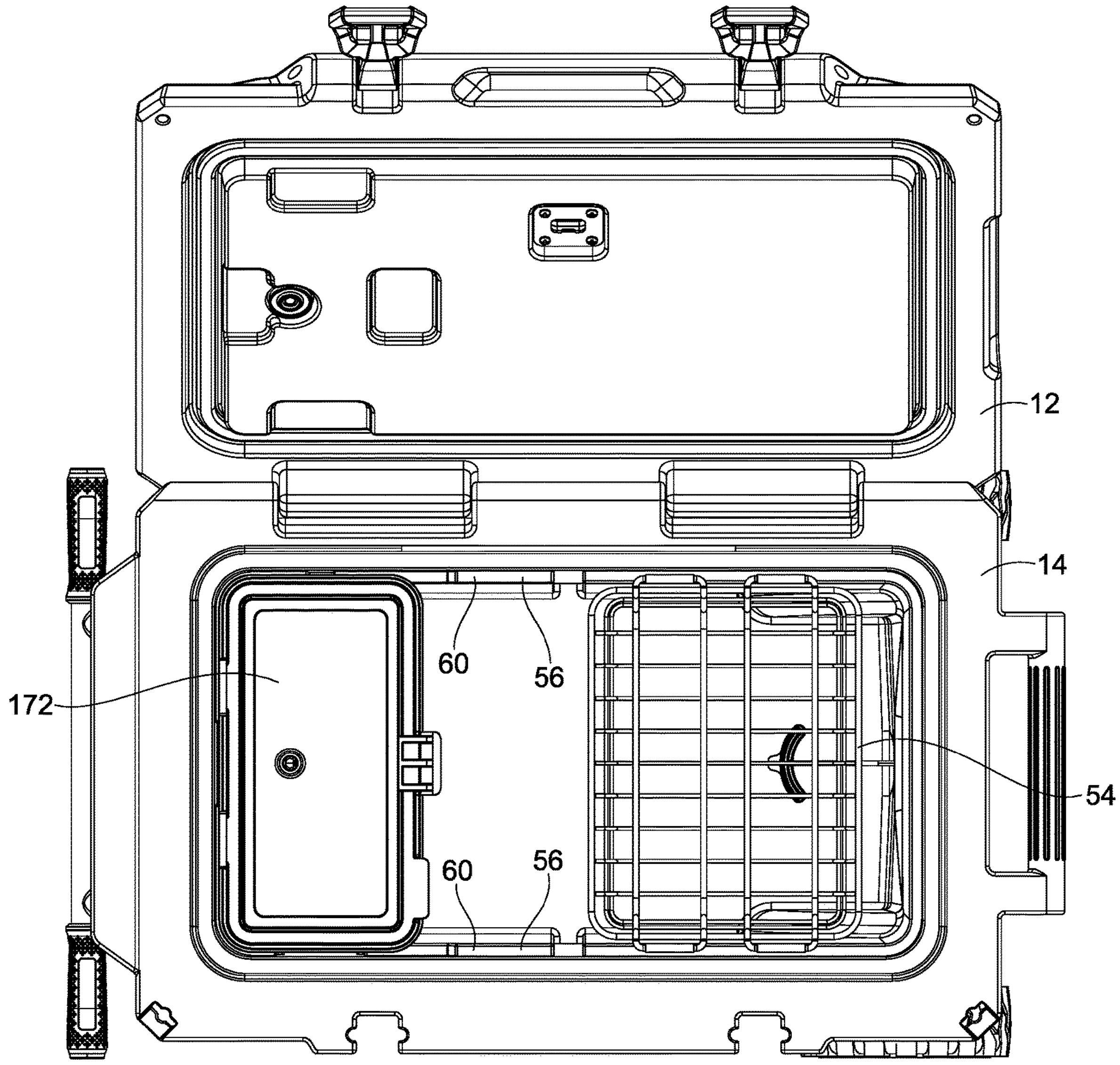
FIG. 11 depicts a perspective view of the insulated container of FIG. 1 with the lid structure in an open configuration and including accessories received in an internal chamber, in accordance with aspects hereof.

Each of the left wall 18, the right wall 20, the front wall 22, and the rear wall 24 may include surface structures in the internal chamber 26. For example, as seen in FIGS. 2 and 4 along the rear wall 24, the right wall 20, and the front wall 22 is a right-side projected panel 50, which projects inwardly into the internal chamber 26. A top edge 52 of the right-side projected panel 50 provides a surface that may support a variety of accessories. For example, a basket 54 (seen in FIGS. 10 and 11) may be supported by the top edge 52. In the illustrated aspect, the top edge 52 is proximate the opening 30 and the right-side projected panel 50 extends downwards therefrom to the inner surface of the bottom wall 16. In other aspects, the top edge 52 could be located at any vertical position within the internal chamber 26 and the right-side projected panel 50 could extend only a partial way down the rear wall 24, the right wall 20, and/or the front wall 22. Likewise, in some aspects, the right-side projected panel 50 may only be formed on one or more of the rear wall 24, the right wall 20, and the front wall 22.

Projecting from the rear wall 24, the left wall 18, and the front wall 22 is a left-side projected panel 56, which projects inwardly into the internal chamber 26 in accordance with some aspects. Although shown as two different projecting panels that wrap around approximately half of the internal chamber 26, the right-side projected panel 50 and the left-side projected panel 56 may comprise a single, unitary projected panel, in other aspects. A top edge 60 of the left-side projected panel 56 provides a surface that may support and/or restrain one or more accessories. For example, a container 172 (seen in FIGS. 10 and 11) may be supported by the top edge 60. One or more notches 62 may be formed in the top edge 60 of the left-side projected panel 56. The one or more notches 62 may cooperate with one or more flanges 188 (seen in FIGS. 10, 11, and 17-26) of an accessory (e.g., the container 172) to both support the accessory in the vertical direction and restrain the accessory in the lateral and/or longitudinal direction(s). In some aspects, a lip 190 formed on the container 172 may be seated upon the top edge 60 (seen in FIGS. 10 and 11). In the illustrated aspect, the top edge 60 is proximate the opening 30 and the left-side projected panel 56 extends downwards therefrom to the inner surface of the bottom wall 16. In other aspects, the top edge 60 could be located at any vertical position within the internal chamber 26 and the left-side projected panel 56 could extend only a partial way down the rear wall 24, the left wall 18, and the front wall 22. Likewise, in some aspects, the left-side projected panel 56 may only be formed on one or more of the rear wall 24, the left wall 18, and the front wall 22.

Also projecting inwardly from each of the front wall 22 and the rear wall 24 is a wheel panel 64. Each of the wheel panels 64 are positioned in a corner space of the internal chamber 26 and abut the right wall 20. The wheel panels 64 result essentially from providing a partial wheel well 66 (best seen in FIGS. 5-7) on an exterior side of the front wall 22 and the rear wall 24, which minimizes the clearance of the insulated container 10 in the lateral direction. Coupled partially within a respective wheel well 66 is a pair of wheels 68. In some aspects, a rear axle 70 (best seen in FIGS. 5, 7, and 12) extends through the bottom wall 16 and each of the pair of wheels 68 is coupled to the rear axle 70.

Figure 12:
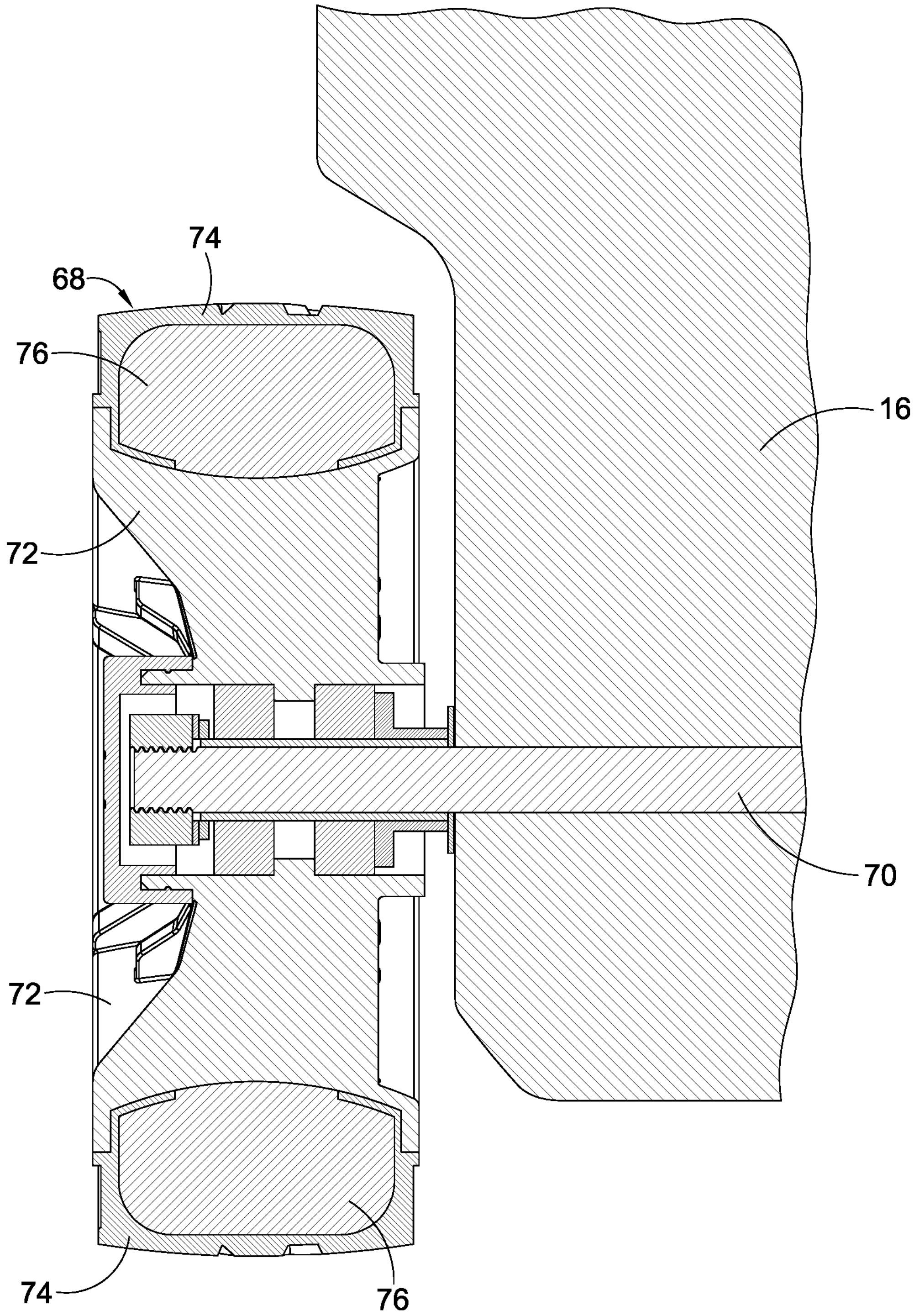
FIG. 12 depicts a cross-section view of a wheel, in accordance with aspects hereof.

Referring to FIG. 12, each of the wheels 68 may include a hub 72, a tread 74, and a foam core 76. The foam core 76 may be positioned between the hub 72 and the tread 74. In this way, superior traction is provided to the insulated container 10 when traveling over any terrain surface. Unlike prior coolers that included air-filled wheels, the wheels 68 of the present disclosure will not go flat should a puncture occur. And unlike prior coolers that included foam-filled plastic wheels, the tread of the present disclosure will not slip on loose terrain. For example, previous coolers had difficulty performing on sandy surfaces and would slide along such surfaces rather than roll over them, which caused unwanted wear on the cooler and the wheels (e.g., abrasion).

Figure 5:
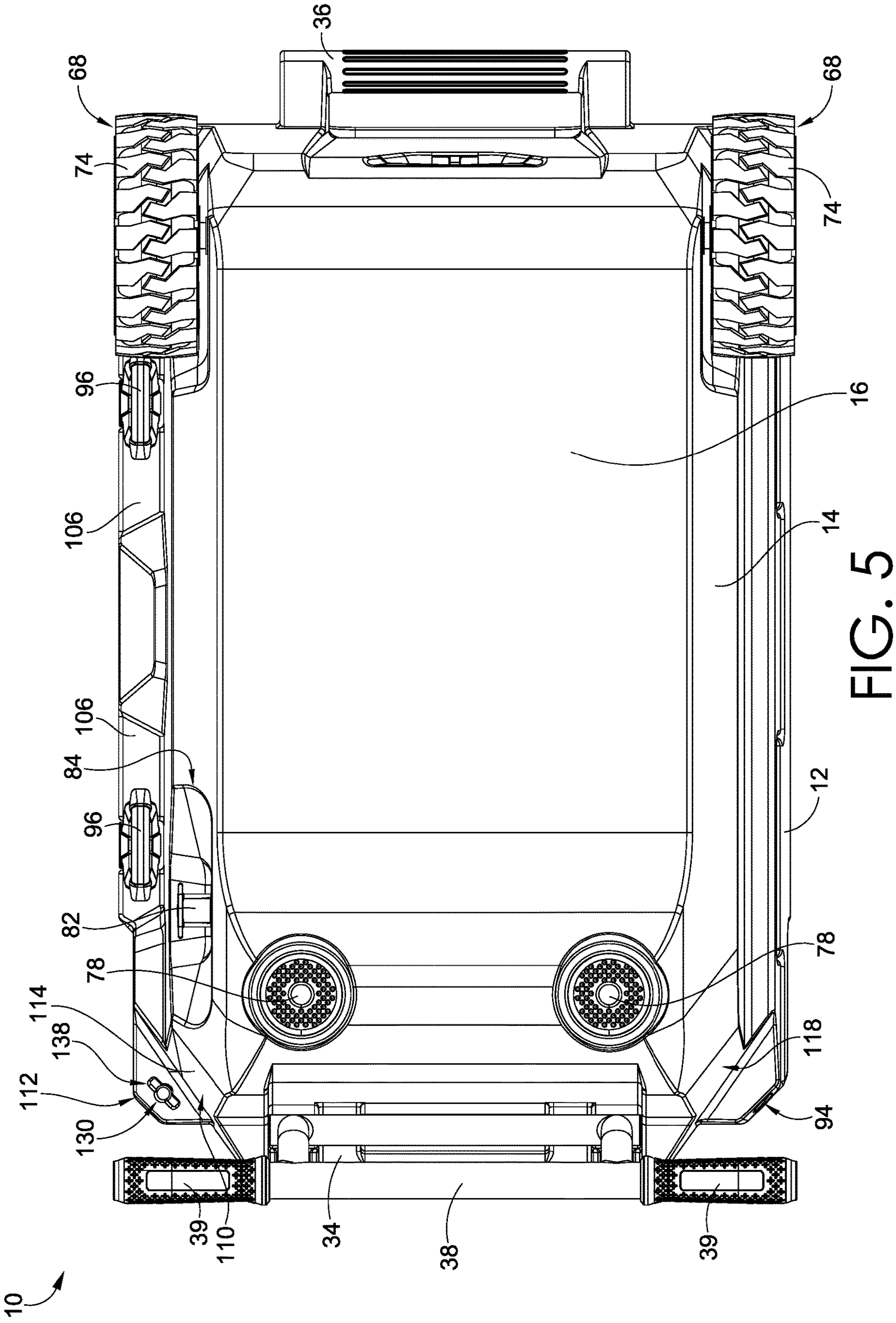
FIG. 5 depicts a bottom view of the insulated container of FIG. 1, in accordance with aspects hereof.

A pair of feet 78 may extend away from an outer surface of the bottom wall 16, as depicted in FIG. 5. Each of the pair of feet 78 is coupled to the bottom wall 16 of the insulated container 10. A surface treatment is shown on a ground contacting surface of the pair of feet 78 to provide increased traction to the insulated container 10. For example, the surface treatment of the pair of feet 78 may resist sliding when the insulated container 10 is placed on an uneven surface.

Figure 6:
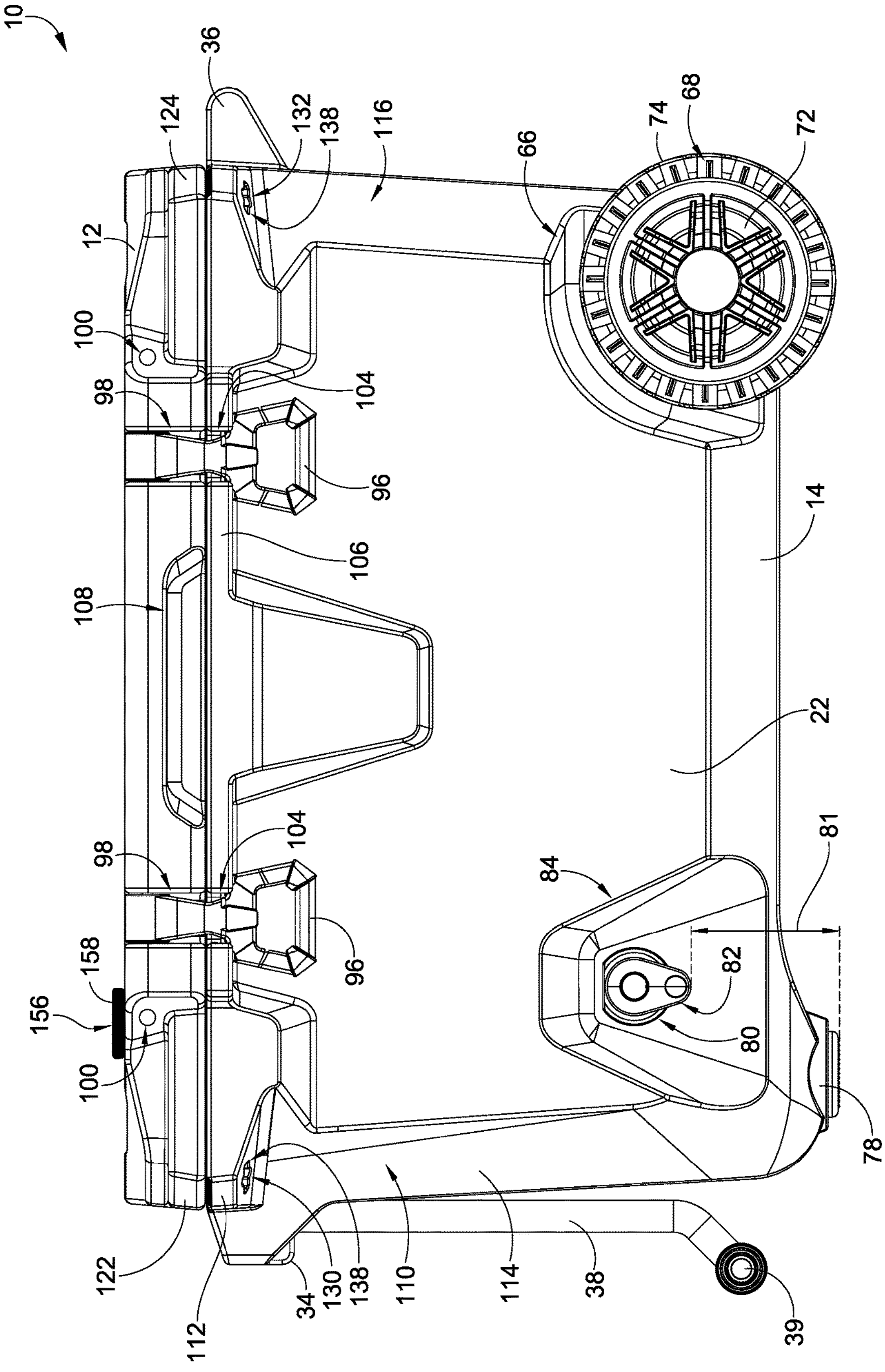
FIG. 6 depicts a front elevation view of the insulated container of FIG. 1 with the lid structure in the closed configuration, in accordance with aspects hereof.

Referring to FIG. 6 and as will be discussed in further detail below, a passageway 80 is formed through the front wall 22. The passageway 80 is positioned proximate the bottom of the front wall 22 and proximate the left side of the front wall 22. In other aspects, the passageway 80 could be positioned at other points on the front wall 22 or any of the other walls (e.g., left wall 18, right wall 20, rear wall 24). The passageway 80 is configured to receive a spigot assembly 82 therethrough. As will be discussed in further detail below, the spigot assembly 82 is configured to communicate fluid from the container 172 held within the internal chamber 26 out of the insulated container 10. For example, the spigot assembly 82 may be used to pour a liquid into a receptacle. A portion of the front wall 22 is debossed proximate the passageway 80 to form a dispensing well 84. The dispensing well 84 may be debossed a depth longer than the length the spigot assembly 82 extends from the front wall 22. In other words, the spigot assembly 82 may be recessed within the dispensing well 84. A recessed spigot assembly 82 may avoid snags or impacts with environmental objects (e.g., branches, vines, rocks, etc.) when the insulated container 10 is moved between locations. The dispensing well 84 is also shaped to provide ease of access when pouring a liquid from the spigot assembly 82.

Further aspects position the passageway 80 at a height necessary to provide a clearance 81 to the spigot assembly 82 above a terrain surface the insulated container 10 is placed upon. In some aspects, the clearance 81 may be selected from the range of about 1 inch to about 6 inches. In other aspects, the clearance 81 may be selected from the range of about 2 inches to about 4 inches. In still other aspects, the clearance 81 may be about 3 inches, which may provide a sufficient clearance for most receptacles to receive liquid from the container 172 without having to tilt the insulated container 10.

Referring to FIGS. 1-4 and 8, the lid structure 12 may be coupled to the base structure 14 so that it can move between a closed configuration (seen in FIG. 1, for example) and an open configuration (seen in FIG. 2, for example). The lid structure 12 is pivotally coupled to the base structure 14 with a pivot rod 86 (seen in FIG. 7). Recessed portions 88 may be formed in the top of the rear wall 24 and extend below the planar surface 28 of the base structure 14. These recessed portions 88 may be configured to receive respective extension portions 90 that may extend from a lid planar surface 92 proximate a rear edge of the lid structure 12. A cylindrical hole 94 may extend through the rear wall 24 proximate its top edge and in line with the recessed portions 88 and may also extend through the extension portions 90. The pivot rod 86 may be received in the lumen of the cylindrical hole 94, thus allowing the lid structure 12 to pivot relative to the base structure 14. In the illustrated aspect, the pivot rod 86 is nearly entirely enclosed by either the rear wall 24 or the extension portions 90.

A pair of buckles 96 may be coupled to the lid structure 12 on the opposite side (e.g., the front edge) from the extension portions 90. Each of the buckles 96 may include a strap portion and body portion. Notches 98 may be formed in the front edge of the lid structure 12 and a cylindrical hole 100 may extend in the longitudinal direction proximate the front edge of the lid structure 12 such that a pivot rod 102 passing therethrough extends through the notches 98. The pair of buckles 96 may be coupled to the pivot rod 102. In some aspects, the buckles 96 may be looped around the pivot rod 102 such that they rotate relative to the pivot rod 102 and relative to the insulated container 10. In other aspects, the buckles 96 may be fixed to the pivot rod 102 such that they rotate with the pivot rod 102 and relative to the insulated container 10. Although shown as a single rod, the pivot rod 102 may comprise a plurality of rod portions such that each buckle may move independently of the other.

Notches 104 may be formed through a lip 106 of the base structure 14. The lip 106 may extend outward from the top of the front wall 22 and comprise a portion of the planar surface 28. The notches 104 may be vertically aligned with the notches 98 of the lid structure 12, as seen in FIG. 6. To secure the lid structure 12 in the closed configuration the strap portion of the buckles 96 is positioned in the notches 98 and the notches 104 and the body portion of the buckles 96 is positioned beneath the lip 106. In the closed configuration, the lid planar surface 92 of the lid structure 12 is proximate the planar surface 28 of the base structure 14 around all sides of the opening 30. In contrast, when in the open configuration, the lid planar surface 92 is rotated away from the planar surface 28 of the base structure 14. A handle 108 may be formed along the front edge of the lid structure 12. The handle 108 may provide an accessible place to grasp the lid structure 12 and move it into, or out of, the closed configuration. In the illustrated aspect, the handle 108 is positioned at a central point along the front edge of the lid structure 12 between the notches 98. In other aspects, the handle may be formed on any portion of the lid structure 12. For example, the illustrated aspect also includes a handle 108A along the right edge of the lid structure 12 and proximate the right handle 36, when the lid structure 12 is in the closed configuration.

Turning to FIGS. 1-4 and 13-16, the corners of the base structure 14 are formed at an angle to the front, rear and side walls. For example, a first corner portion 110 may be formed on an exterior side where the front wall 22 transitions to the left wall 18. The first corner portion 110 may have a surface that is set at an angle to the surface of the front wall 22 and the surface of the left wall 18. In some aspects, the angle is between 30 degrees and 60 degrees from either the front wall 22 or the left wall 18. In other aspects, the angle is 45 degrees from both the front wall 22 and the left wall 18. In still other aspects, the first corner portion 110 may comprise an upper corner portion 112 and a lower corner portion 114. The upper corner portion 112 may extend from an upper portion of both the front wall 22 and the left wall 18 and be proximate to and/or form a portion of the planar surface 28. The lower corner portion 114 may be recessed from the upper corner portion 112 such that the upper corner portion 112 extends past the lower corner portion 114 when viewed from above. Further, the angle at which the surface of the lower corner portion 114 extends relative to the surfaces of the front wall 22 and the left wall 18 may be different from the angle at which the surface of the upper corner portion 112 extends relative to the same surfaces.

Each of the other corner portions of the base structure 14 may have a similar structure as described in reference to the first corner portion 110 formed between the front wall 22 and the left wall 18. For example, a second corner portion 116 formed between the front wall 22 and the right wall 20 may be a mirror image of the first corner portion 110 taken along a mirror line extending in the lateral direction at a longitudinal center of the base structure 14. Similarly, a third corner portion 118 (seen in FIGS. 5, 8 and 9) formed between the rear wall 24 and the left wall 18 and a fourth corner portion 120 (seen in FIGS. 7 and 8) formed between the rear wall 24 and the right wall 20 may each be mirror images of the first corner portion 110 and the second corner portion 116 taken along a mirror line extending in the longitudinal direction at a lateral center of the base structure 14.

Similarly, the lid structure 12 may include a first corner portion 122 formed between the front edge and a left edge of the lid structure 12, a second corner portion 124 formed between the front edge and a right edge of the lid structure 12, a third corner portion 126 formed between a rear edge and the left edge of the lid structure 12, and a fourth corner portion 128 formed between the rear edge and the right edge of the lid structure 12.

In some circumstances, it may be desirable to secure the lid structure 12 in the closed configuration by more than just the buckles 96. For example, when storing food on a campsite known to have bears in the area, it can be prudent to secure the lid structure 12 in the closed configuration with one or more locks (e.g., padlock(s)). Thus, the insulated container 10 may include a first locking hole 130 through the lid structure 12 proximate the first corner portion 122 and continuing through the base structure 14 proximate the first corner portion 110. More particularly, the first locking hole 130 may extend through the upper corner portion 112 of the first corner portion 110 in a part that extends past the recessed lower corner portion 114. A second locking hole 132 may have a reciprocal structure through the lid structure 12 proximate the second corner portion 124 and continuing through the base structure 14 proximate the second corner portion 116.

Figure 14:
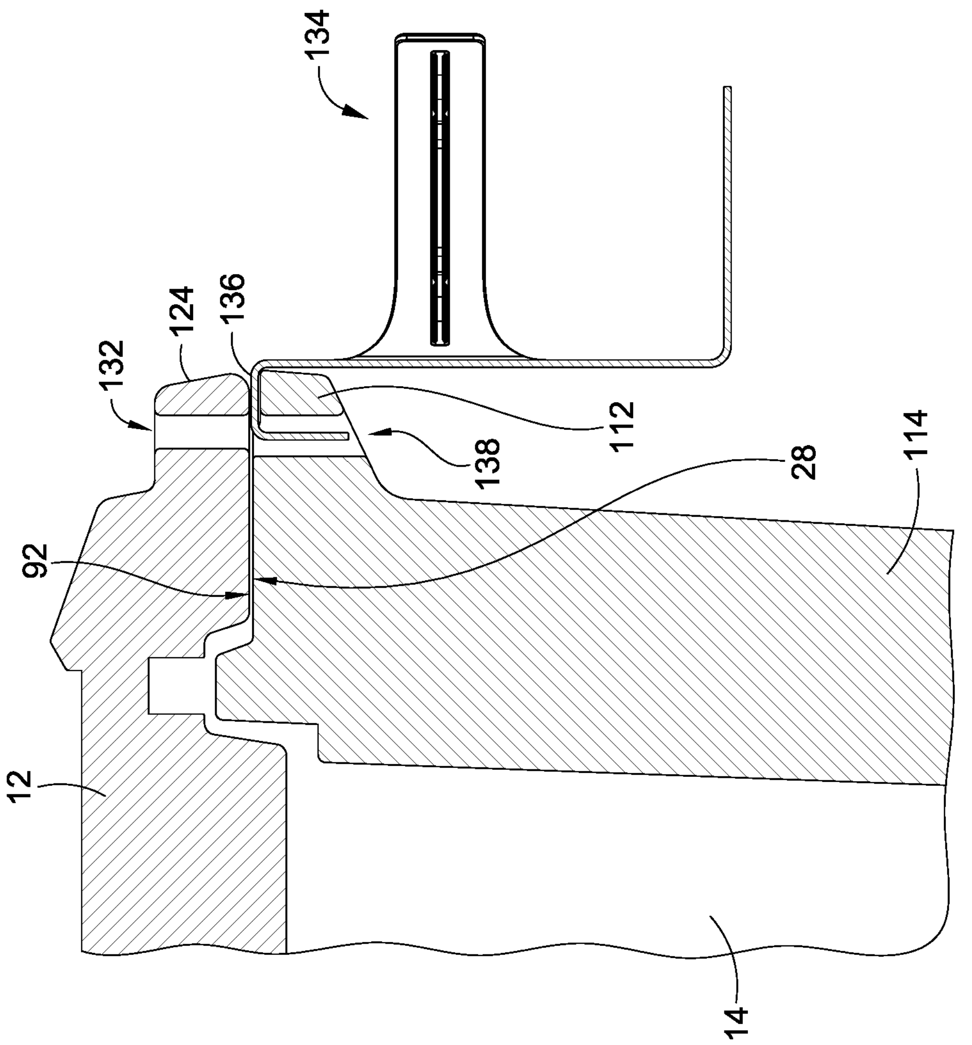
FIG. 14 depicts a cross-section view of the accessory of FIG. 13 as received at a corner of the insulated container of FIG. 1, in accordance with aspects hereof.
Figure 13:
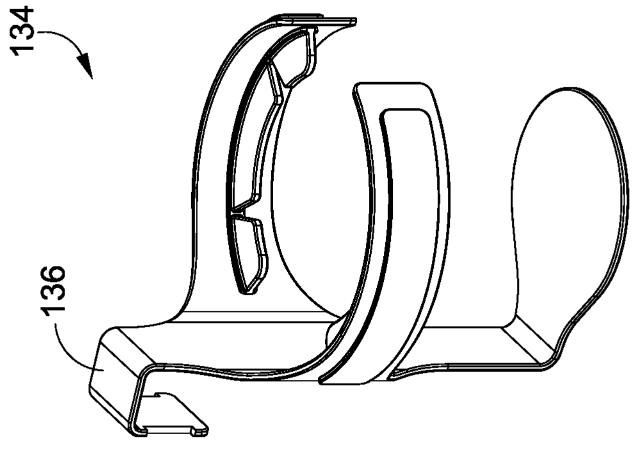
FIG. 13 depicts a perspective view of an accessory for use with the insulated container of FIG. 1, in accordance with aspects hereof.

These angled corner portions may provide a mounting point on the insulated container 10 for optional equipment or accessories. For example, a basket 134 may be coupled to the insulated container 10 for holding objects therein, as depicted in FIGS. 13 and 14. The basket 134 may comprise a drink holder configured to hold a can or a bottle, in aspects. The basket 134 includes a clip 136 that is received through a slot 138 formed in the upper corner portion 112. The slot 138 may overlap with the first locking hole 130 or the second locking hole 132 if formed in of the first corner portion 110 or the second corner portion 116, respectively. The clip 136 may extend between the planar surface 28 of the base structure 14 and the lid planar surface 92 of the lid structure 12. Thus, the lid structure 12 may provide some restraint to the basket 134 when the lid structure 12 is in the closed configuration. However, the lid structure 12 is not required to be in the closed configuration in order for the basket 134 to be held on the base structure 14.

Figure 16:
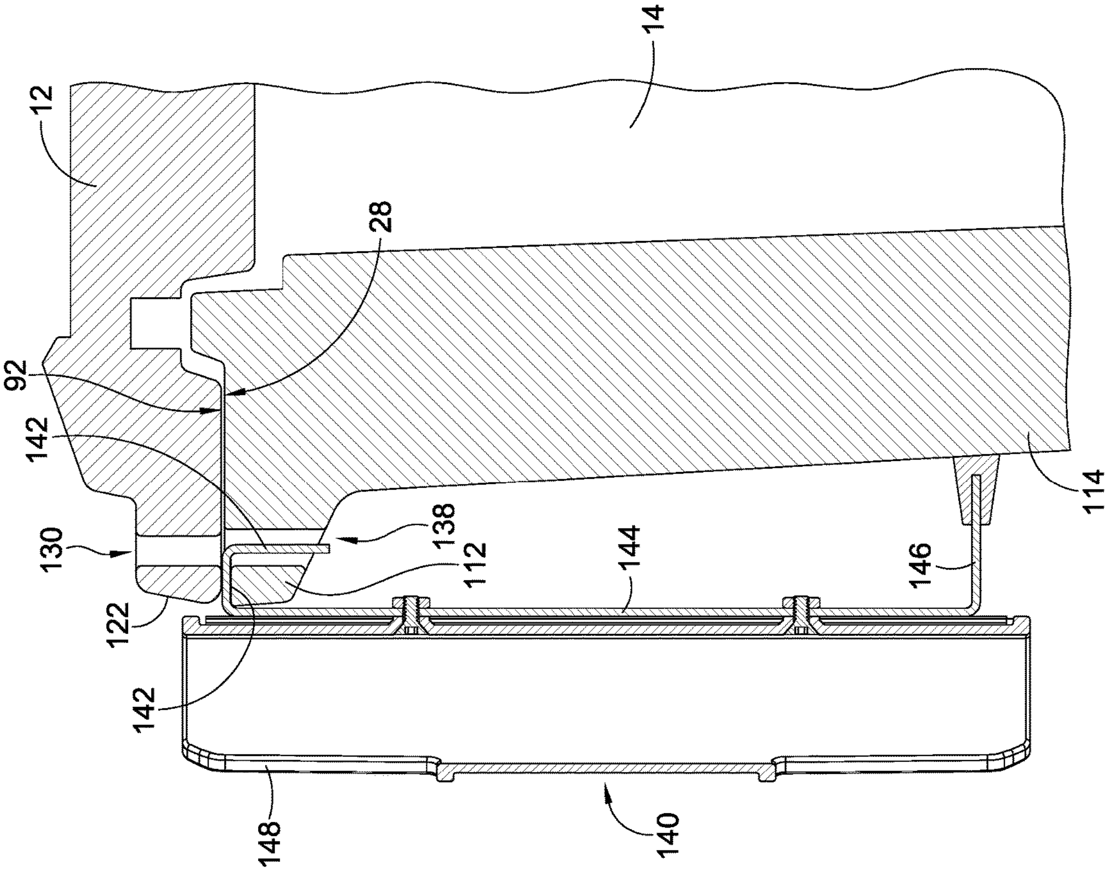
FIG. 16 depicts a cross-section view of the accessory of FIG. 15 as received at a corner of the insulated container of FIG. 1, in accordance with aspects hereof.
Figure 15:
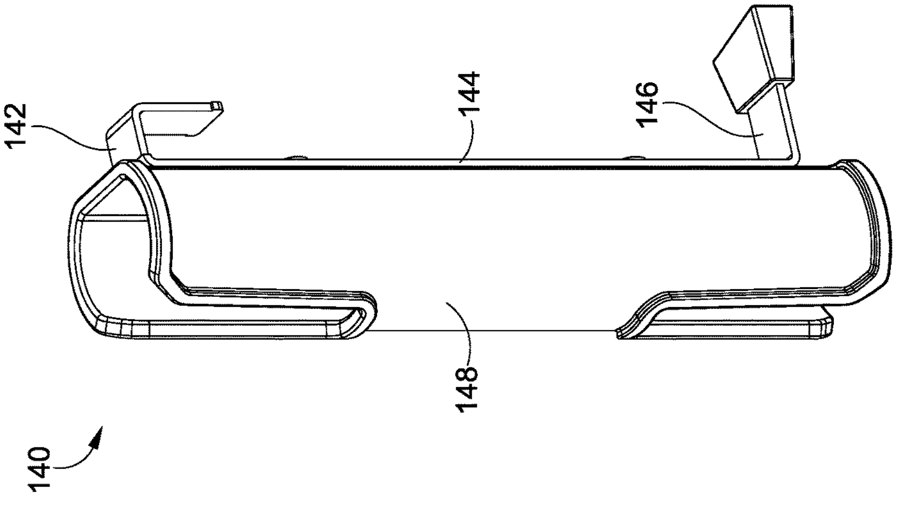
FIG. 15 depicts a perspective view of another accessory for use with the insulated container of FIG. 1, in accordance with aspects hereof.

As another example, a rod holder 140 (e.g., for a fishing rod) may be similarly coupled to a corner of the insulated container 10, as shown in FIGS. 15 and 16. The rod holder 140 may include a top clip 142 similar to the clip 136 and that extends through the slot 138 in the upper corner portion 112. The top clip 142 may also include a body structure 144 that extends downwardly to a bottom brace 146. A rod sleeve 148 may be coupled to the body structure 144 and configured to receive a portion of a fishing rod. The bottom brace 146 may extend towards and contact a surface of the lower corner portion 114.

Coupling accessories (such as the rod holder 140 and the basket 134) to corners of the insulated container 10 provides advantages over designs of the prior art. For example, prior art coolers coupled accessories on a sidewall near a cooler handle. However, this coupling point has been found to cause problems. For one, it limits the useful orientation of the prior art cooler in some situation based on where the accessory is coupled and the direction the cooler lid opens. For example, a prior art cooler placed on a boat would need to place a fishing rod holding accessory proximate an edge of the boat so that the line would not interfere with ingress/egress from the cooler. Often, this results in the lid opening towards the person trying to access the prior art cooler rather than away from the person as would be desired. Additionally, if multiple accessories are connected in the nearly the same location as was done with prior art coolers, then one accessory becomes an obstruction to another accessory—particularly when quick access is needed. For example, if a drink is held next to a fishing rod and a fish bites a line to the rod, then the rod must be grabbed quickly. If the rod is not grabbed quick enough, the fish may escape the line and/or pull the rod into the water. If the drink holder is positioned adjacent the rod holder, as was the case with prior art coolers, then it can block access to the rod and/or be easily spilled or knocked out of its holder when reaching for the rod. Further, coupling accessories on a sidewall near a cooler handle limited the ability to lift the prior art cooler while the accessories were attached as they could interfere with grasping the cooler handle.

Aspects of the insulated container 10 having corner mounted accessories overcome at least these deficiencies in the prior art designs. For instance, the rod holder 140 may be positioned on any corner of the cooler, in some aspects. This allows the insulated container 10 to always permit the lid structure 12 to open away from a user and have the rod positioned to not interfere with access to the internal chamber 26. Similarly, the basket 134 may be positioned on any other corner than the rod holder 140, in aspects. This allows the basket 134 to be spaced away from the rod holder 140 so as not to create an obstruction adjacent the rod holder 140 and decrease the chance of spilling anything contained in the basket 134.

Returning to FIGS. 2 and 4, the top surface of the lid structure 12 may include a perimeter portion 150 proximate a front edge, a left edge, a right edge, and a rear edge. The perimeter portion 150 may surround a sunken portion 152. A surface of the sunken portion 152 may be lower in the vertical direction than a surface of the perimeter portion 150. This recessed space may be configured to receive a cushion 154. The cushion 154 may provide a more desirable seating experience when a user sits on the insulated container 10 as compared with a hard surface of prior art coolers. The cushion 154 may comprise rubber, styrene-butadiene, neoprene, other types of synthetic elastomers, EVA foam, or any other suitable material. The cushion 154 may be affixed to the top surface of the lid structure 12 through conventional means (e.g., bonding, welding, fastening, etc.). In other aspects, the cushion 154 may be removably coupled to the top surface of the lid structure 12 and may be removed in between uses. As will be discussed in more detail below, a snorkel 156 extends through the lid structure 12. The snorkel 156 is configured to move between a venting configuration where a knob 158 is substantially flush with the surface of the cushion 154 and a sealed configuration where the knob 158 extends above the surface of the cushion 154 (as seen in FIG. 1). An aperture 160 is formed in the cushion 154, through which the snorkel 156 extends.

The bottom surface of the lid structure 12 includes the lid planar surface 92 surrounding a channel 162. The channel 162 extends around a central portion 164 of the bottom surface of the lid structure 12. The channel 162 extends a first distance into the lid structure 12 towards the external top surface thereof. Thus, the bottom of the channel 162 is higher in the vertical direction than the lid planar surface 92 when the lid structure 12 is in the closed configuration. The central portion 164 extends a second distance out of the channel 162 and away from the top surface, where the second distance is greater than the first distance. Thus, the surface of the central portion 164 is lower in the vertical direction than the lid planar surface 92 when the lid structure 12 is in the closed configuration. One or more accessories may be affixed to the central portion 164. For example, a bottle cap opener 166 is fastened to the central portion 164. In the illustrated aspect, debossed regions 168 are formed proximate a left side of the central portion 164. These debossed regions 168 may correspond to portions of items being suspended from the left-side projected panel 56 (e.g., a latches on a lid of an item). In other aspects, this additional clearance is not needed and fewer, or no, debossed regions 168 are formed on the central portion 164. In addition, an interior end of the snorkel 156 extends through the central portion 164.

Coupled partially within the channel 162 is a sealing member 170. The sealing member 170 may comprise an elastomeric ring (e.g., a D-ring, an O-ring, etc.). The channel 162 and the sealing member 170 therein may be aligned with the raised brim 32 on the base structure 14. Thus, when the lid structure 12 is in the closed configuration, the sealing member 170 may contact the raised brim 32 to create a seal for the internal chamber 26.

In aspects so far described herein, the lid structure 12 has been pivotally coupled to the base structure 14 on a rear side.

In other aspects, however, the lid structure 12 may be coupled to the base structure by other means. For example, the lid structure 12 may be removably coupled to the base structure 14. In such aspects, the lid structure 12 is not fixedly attached to the base structure 14 and may be removed without damaging, destroying, or disassembling the insulated container 10. Thus, in these aspects the lid structure 12 may include removable fasteners (e.g., such as buckles 96) along a rear edge which may interact with the base structure 14 to secure the lid structure 12 in the closed configuration. When access to the internal chamber 26 is needed in these aspects, the lid structure 12 may be uncoupled on all sides and the lid structure may be moved away from the base structure 14.

Turning now to FIGS. 17-26, a container 172 configured to hold a liquid will now be described. The container 172 is configured to be coupled to the insulated container 10 and dispense the liquid through the spigot assembly 82 without the need to open the lid structure 12. The container generally comprises a tank having a bottom 174 and sidewalls extending vertically up from the bottom 174. The container 172 includes four sidewalls, a front sidewall 176, a left sidewall 178, a rear sidewall 180, and a right sidewall 182. Each of the sidewalls is joined to the adjacent sidewalls at the corners of the container 172. The bottom may slope from the rear sidewall 180 towards the front sidewall 176 to encourage liquid contained therein to flow towards the front sidewall 176. In some aspects, the bottom 174 and the sidewalls are integral to one another. A lid 184 couples to the top of the sidewalls to enclose a liquid within the container 172.

An opening 186 is formed in the front sidewall 176 proximate the bottom 174. As discussed in detail below, the spigot assembly 82 may couple to the container 172 at the opening 186. Thus, liquid contained within the container 172 may flow out of the insulated container 10 (e.g., to a beverage container) via the spigot assembly 82. In this way, a liquid (e.g., a beverage, mixed drink, water, etc.) may be stored in the container 172 that in turn may be stored in the internal chamber 26 of the insulated container 10, which can provide a temperature controlled environment until it is desirable to dispense the stored liquid.

Coupling the container 172 to the insulated container 10 may be accomplished in a variety of ways. For example, the container 172 may be placed in the internal chamber 26 proximate the passageway 80 through the front wall 22. In the illustrated aspect, the container 172 is suspended from the left-side projected panel 56 adjacent the left wall 18. The container 172 includes one or more flanges 188 on the outer surface of one or more sidewalls. The container 172 includes a first flange **188*a* on the front sidewall 176, a second flange 188*b* on the left sidewall 178, and a third flange 188*c* on the rear sidewall 180. The one or more flanges 188 may be received in the one or more notches 62 formed in the left-side projected panel 56. The cooperation between the one or more notches 62 and the one or more flanges 188 align the container 172 with the base structure 14 so that the opening 186 is concentrically aligned with the passageway 80. In other aspects, such as those using an alternative spigot assembly, the opening 186 and the passageway 80** need not be aligned.

The one or more flanges are positioned adjacent to, and beneath, a lip 190 that extends around the outside surface of the sidewalls. The lip 190 is located proximate a top edge of the sidewalls. On the inside surface of the sidewalls, proximate the top edge, is a shoulder 192. The shoulder 192 extends around the inside surface of the sidewalls. The lid 184 is seated on the shoulder 192 when the lid is in a closed configuration. Similarly, one or more latches 194 clasp the lip 190 when the lid 184 is in the closed configuration. In the one aspect of lid 184 shown in FIG. 17, four latches 194 are present. In this aspect, the lid 184 may be removably coupled to the container 172 with the latches 194. For example, the lid 184 may be seated on the shoulder 192 within a rim of the sidewalls and then the latches 194 may lock the lid 184 in position by engaging the lip 190.

In another aspect of lid 184 shown in FIGS. 18-26, one latch 194 is present. In this aspect, the lid 184 may be pivotally coupled to the container 172. For example, the lid 184 may include one or more flanges 196 that extend into one or more respective slots 198 formed in one or more of the sidewalls (e.g., the left sidewall 178) of the container 172. When engaged, the one or more flanges 196 may allow the lid 184 to pivot relative to the container 172. Thus, when putting this aspect of the lid 184 on, the lid 184 may be held at an angle to the container 172 with the one or more flanges 196 aligned with the slots 198. Once the flanges 196 are received by the slots 198, the lid may be pivoted downwardly until it is seated on the shoulder 192. Then the latch 194 may engage the lip 190 to secure the lid 184 in position. To remove this aspect of lid 184, a handle 200 may be lifted to pivot the lid 184 away from the shoulder 192.

The lid 184 includes a central panel 202, an outer perimeter surface 203, a channel portion 204 surrounding the central panel 202 and extending between the central panel 202 and the outer perimeter surface 203, and a sealing flange 206 extending downwardly from the outer perimeter surface 203 and surrounding the channel portion 204. In some aspects, the sealing flange may include one or more gaskets (e.g., O-rings, D-rings, etc.) that engage the inner surface of the sidewalls of the container 172 above the shoulder 192. In other aspects, the sealing flange 206 may include a sealing member on a distal end thereof that engages the shoulder 192.

In some aspects, the lid 184 includes a vent opening 208. The vent opening 208 may be configured to interact with the snorkel 156, as further discussed below. When dispensing liquid from the container 172, the snorkel 156 may provide air to the container 172 through the vent opening 208. This may advantageously allow the liquid contained within the container 172 to be communicated through the spigot assembly 82 without any, or with minimal, chugging (i.e., intake of air through the spigot assembly 82 to replace the fluid in the container 172 that is being dispensed out). Chugging can negatively affect the liquid being dispensed, such as by mixing the liquid too much as it is dispensed and/or mixing the liquid retained in the container 172 too much, among other ways.

Figure 17:
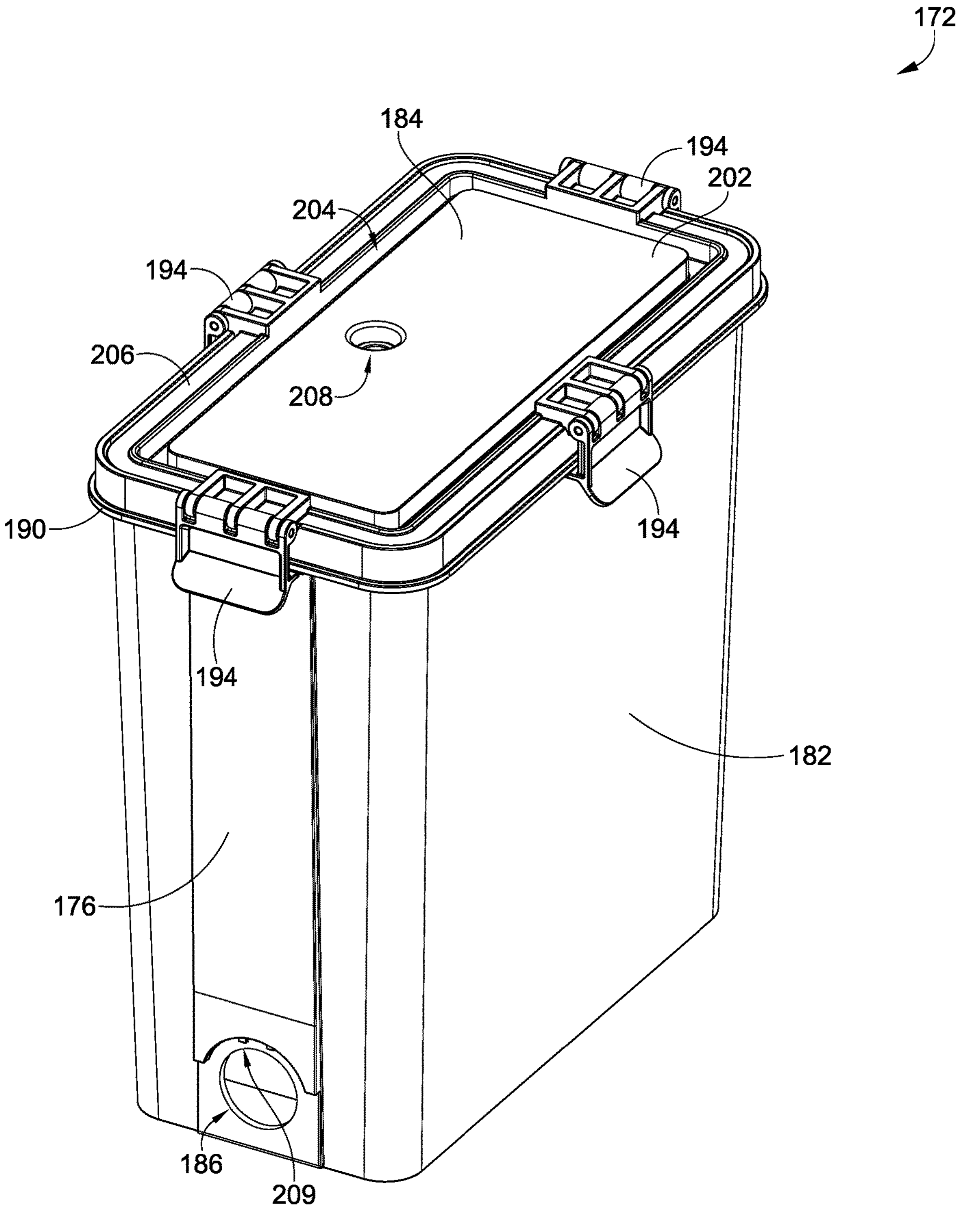
FIG. 17 depicts a perspective view of a liquid container, in accordance with aspects hereof.
Figure 18:
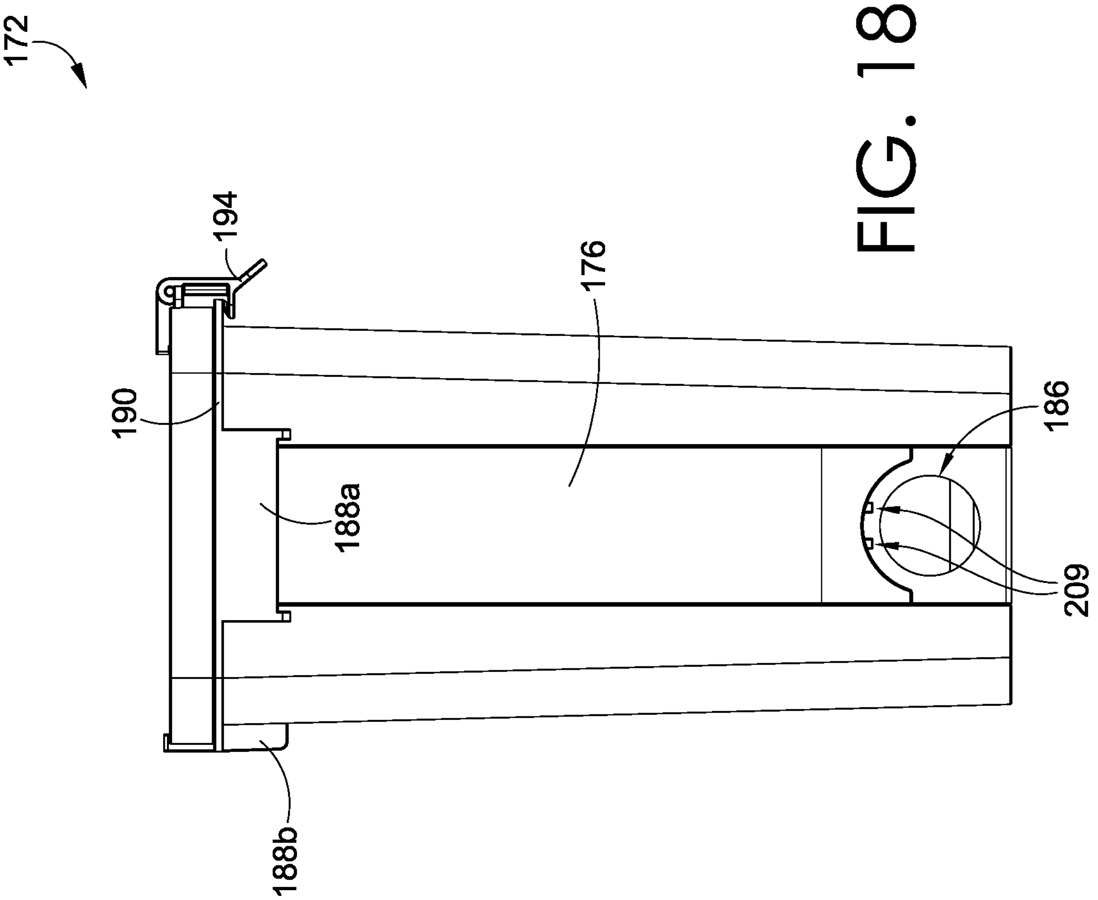
FIG. 18 depicts a perspective view of the liquid container of FIG. 17 having a different lid coupled thereto, in accordance with aspects hereof.
Figure 19:
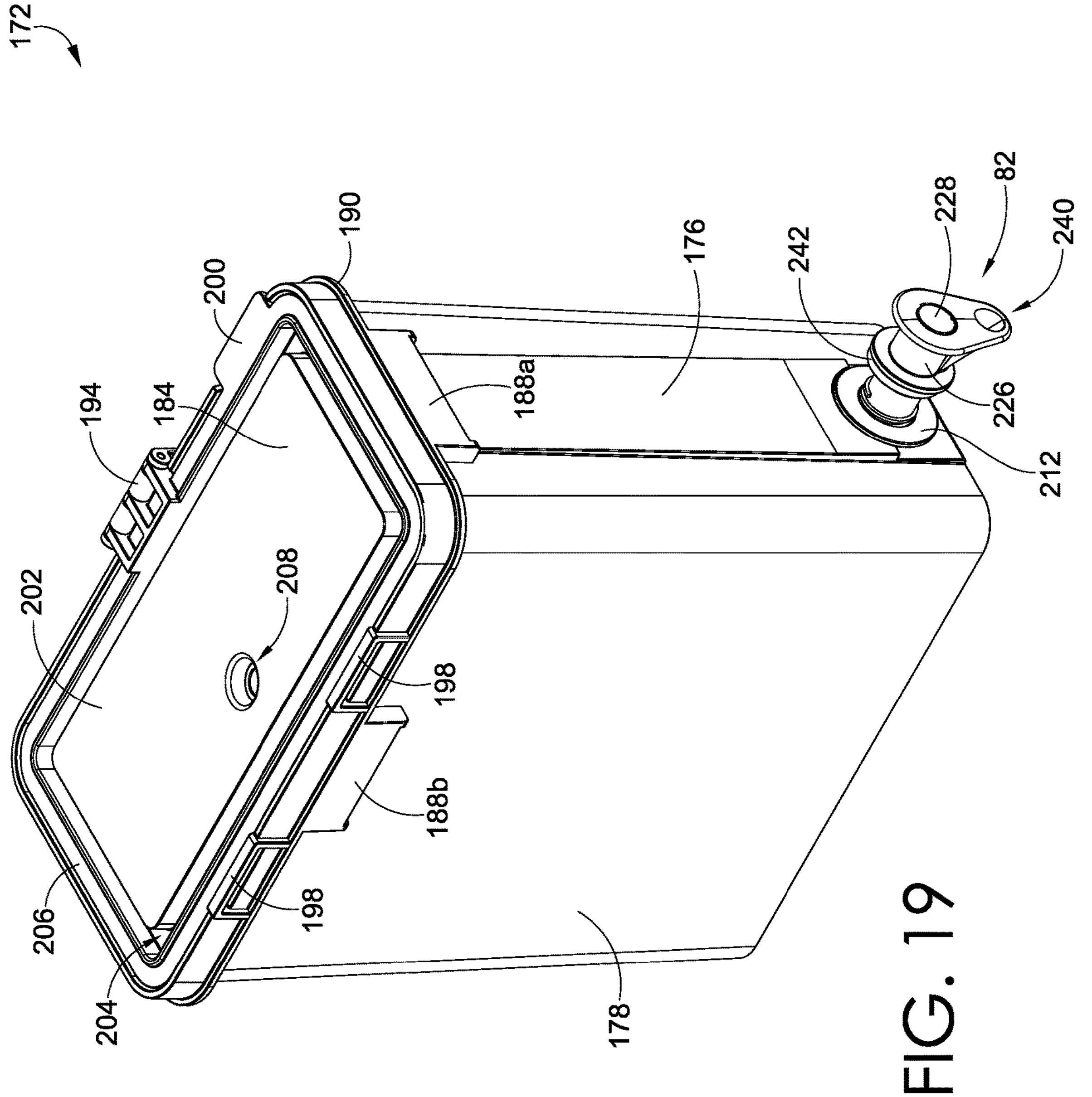
FIG. 19 depicts a perspective view of the liquid container of FIG. 18 having a spigot assembly coupled thereto, in accordance with aspects hereof.
Figure 21:
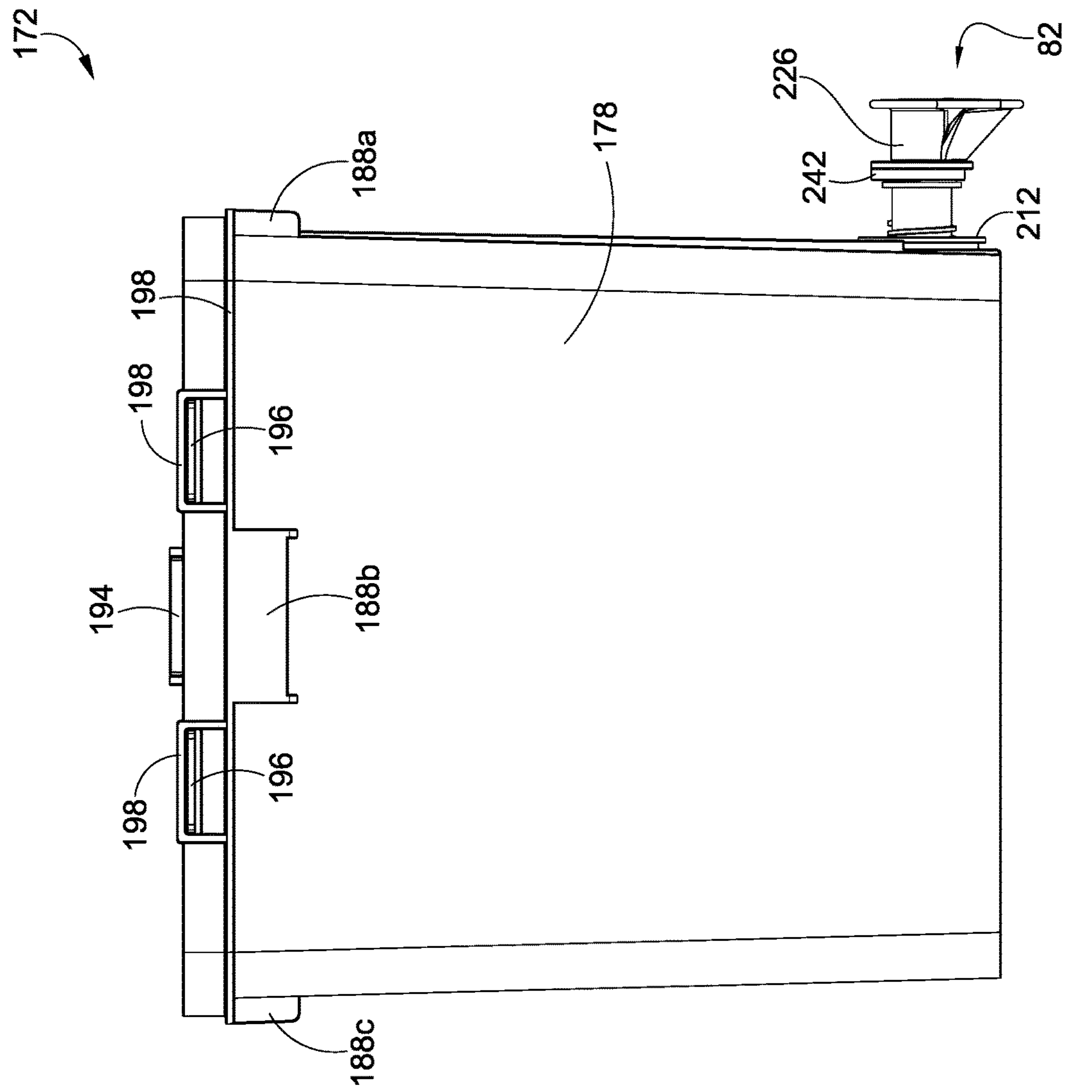
FIG. 21 depicts a left side elevation view of the liquid container of FIG. 18 having a spigot assembly coupled thereto, in accordance with aspects hereof.
Figure 20:
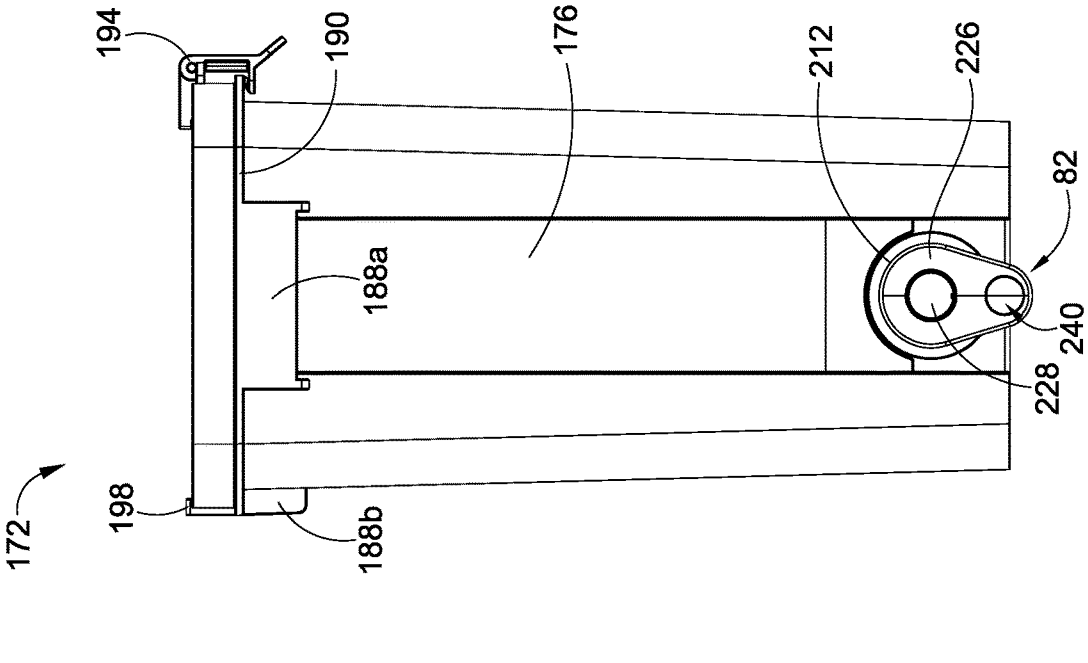
FIG. 20 depicts a front elevation view of the liquid container of FIG. 18 having a spigot assembly coupled thereto, in accordance with aspects hereof.
Figure 23:
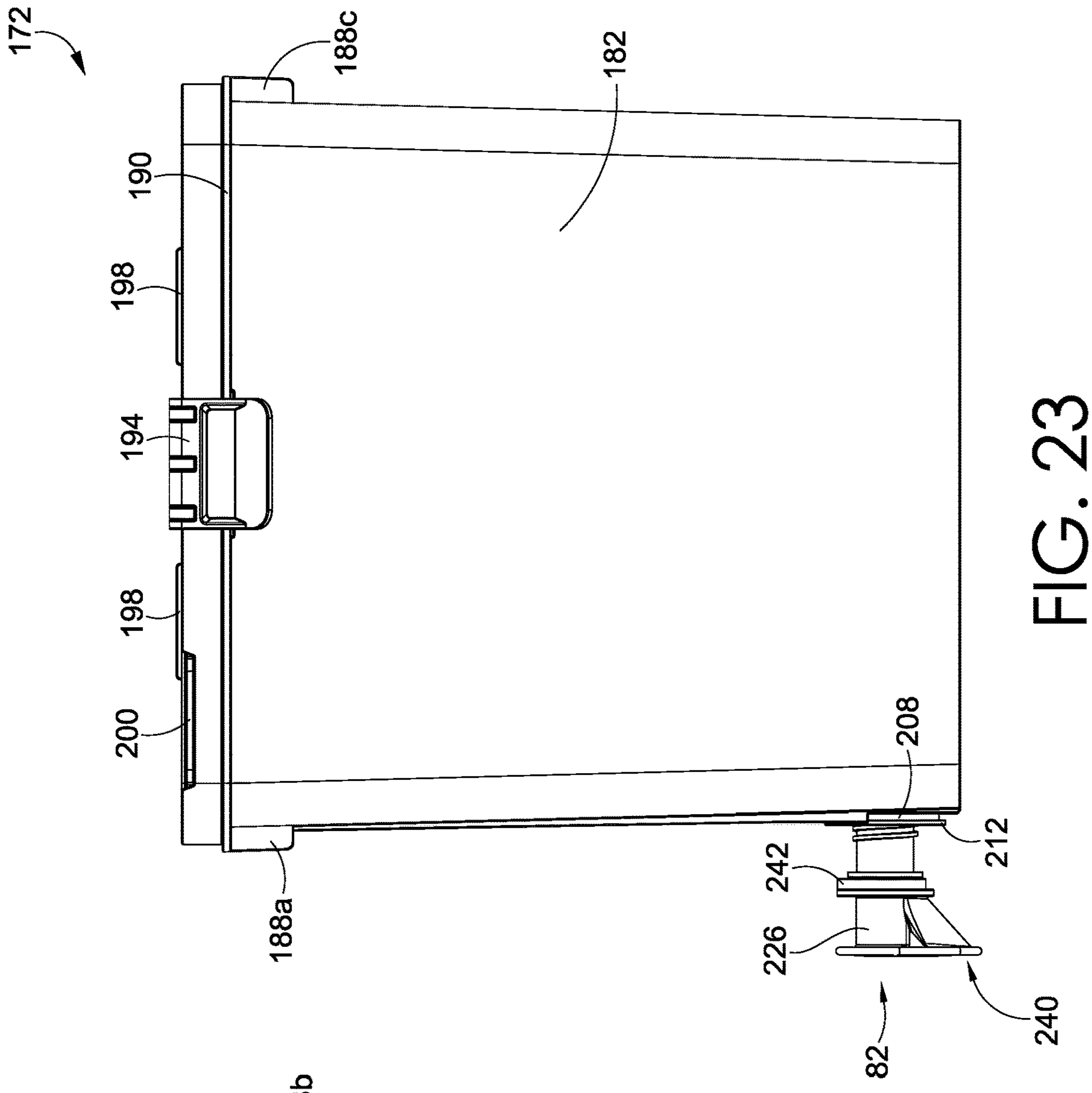
FIG. 23 depicts a right side elevation view of the liquid container of FIG. 18 having a spigot assembly coupled thereto, in accordance with aspects hereof.
Figure 22:
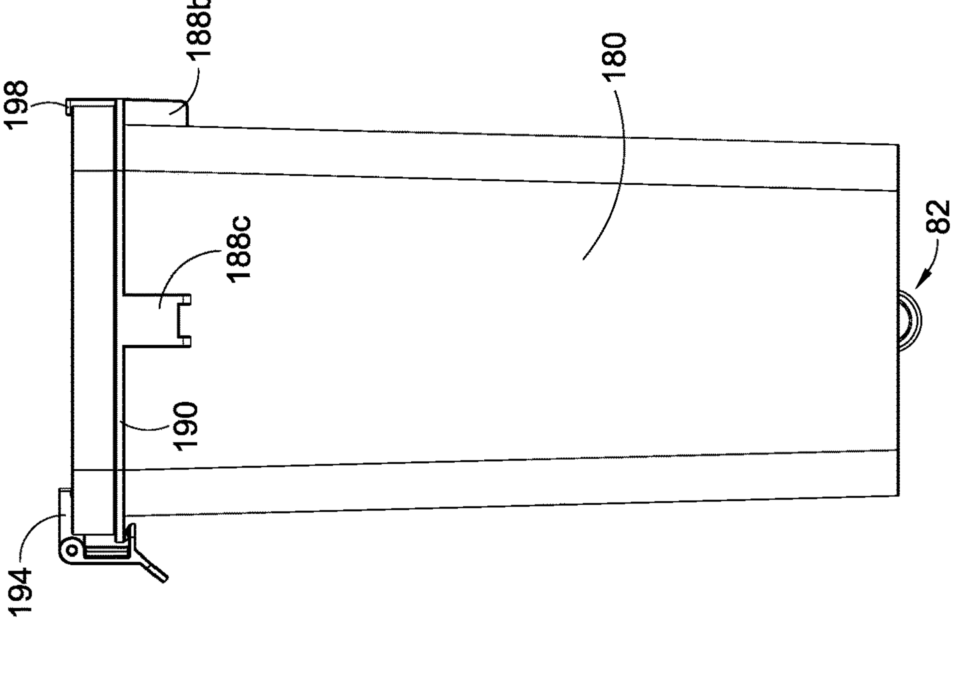
FIG. 22 depicts a rear elevation view of the liquid container of FIG. 18 having a spigot assembly coupled thereto, in accordance with aspects hereof.
Figure 24:
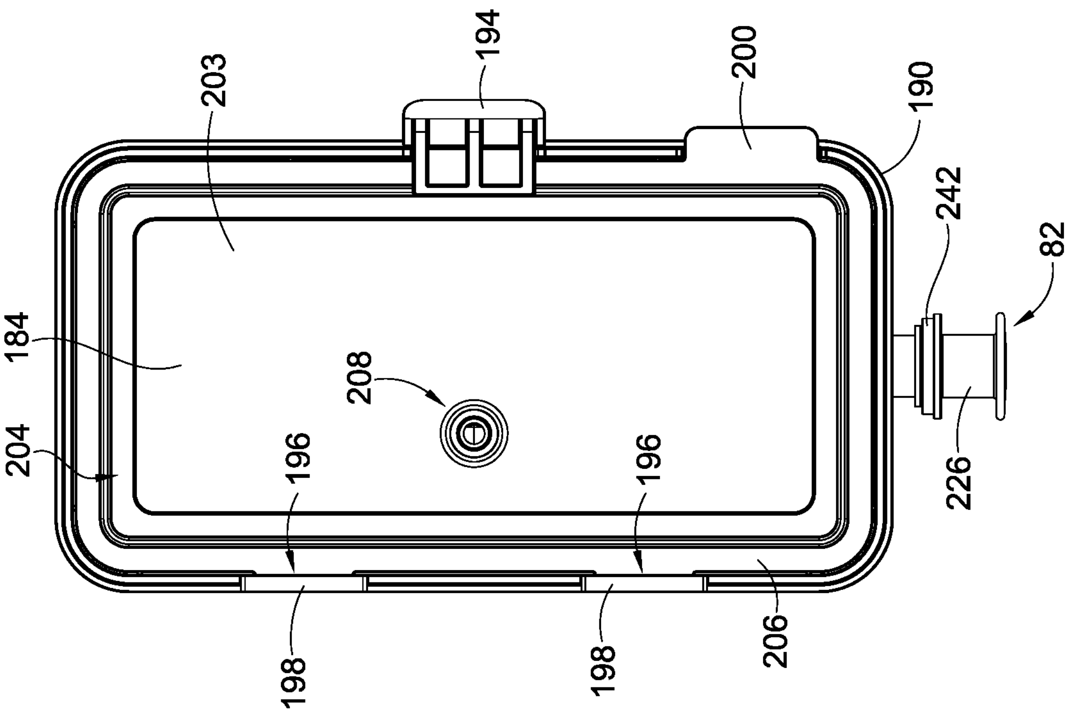
FIG. 24 depicts a top view of the liquid container of FIG. 18 having a spigot assembly coupled thereto, in accordance with aspects hereof.
Figure 25:
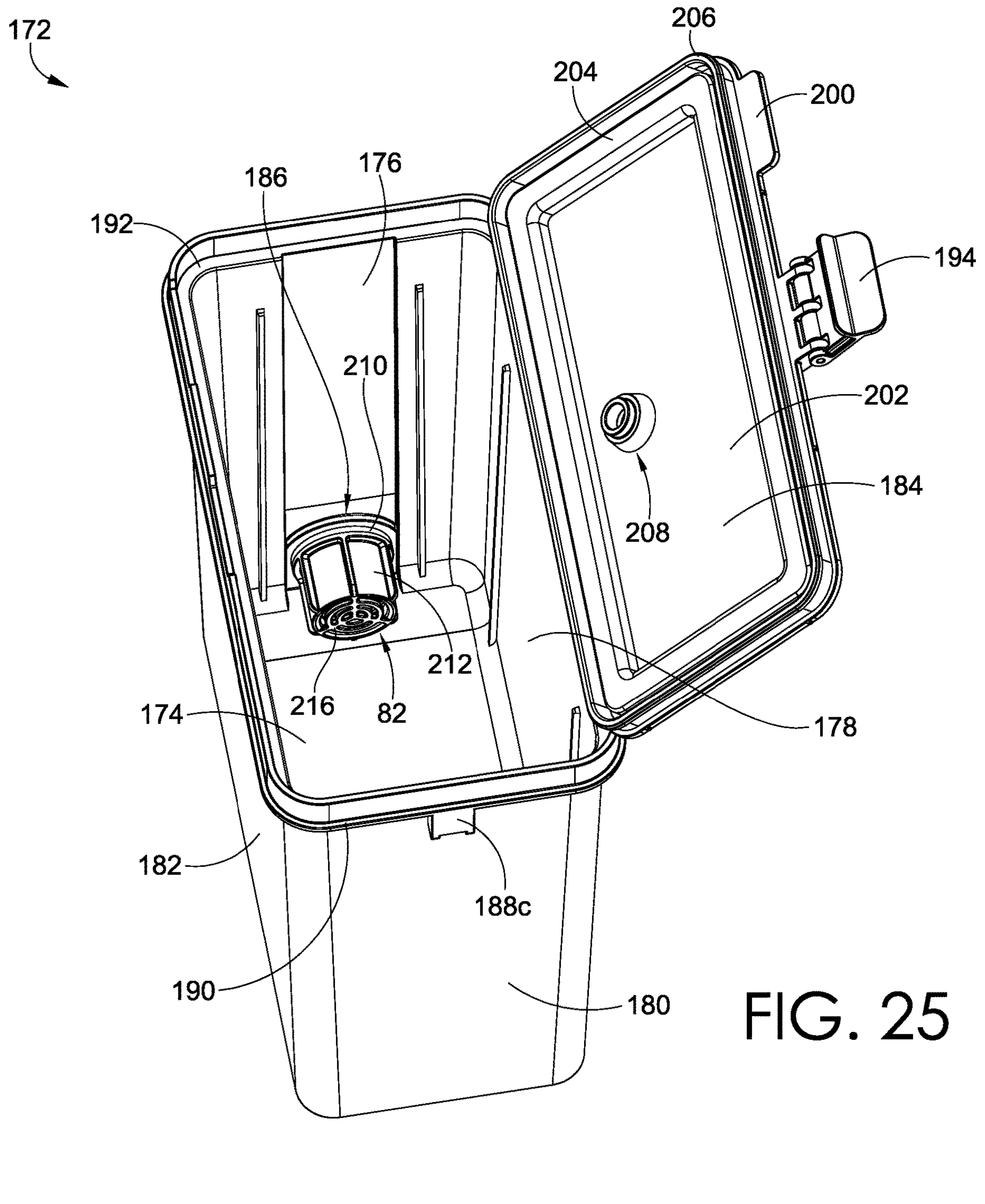
FIG. 25 depicts a perspective view of the liquid container of FIG. 18 having the lid open, in accordance with aspects hereof.
Figure 26:
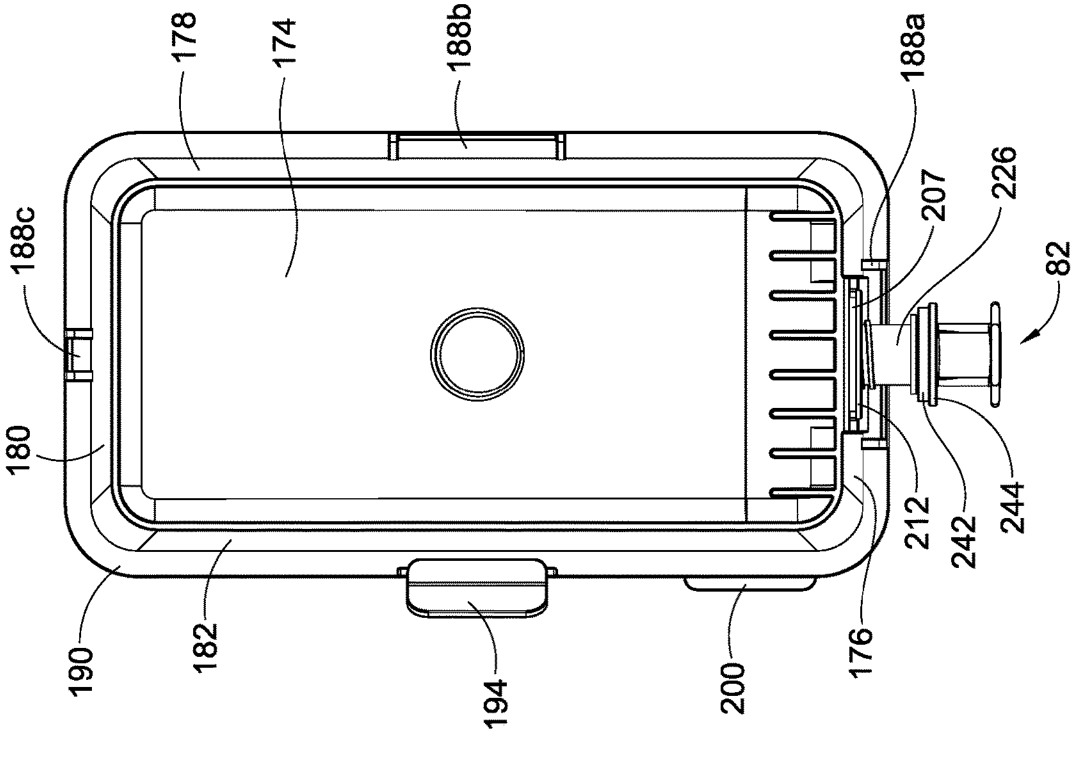
FIG. 26 depicts a bottom view of the liquid container of FIG. 18 having a spigot assembly coupled thereto, in accordance with aspects hereof.
Figure 27:
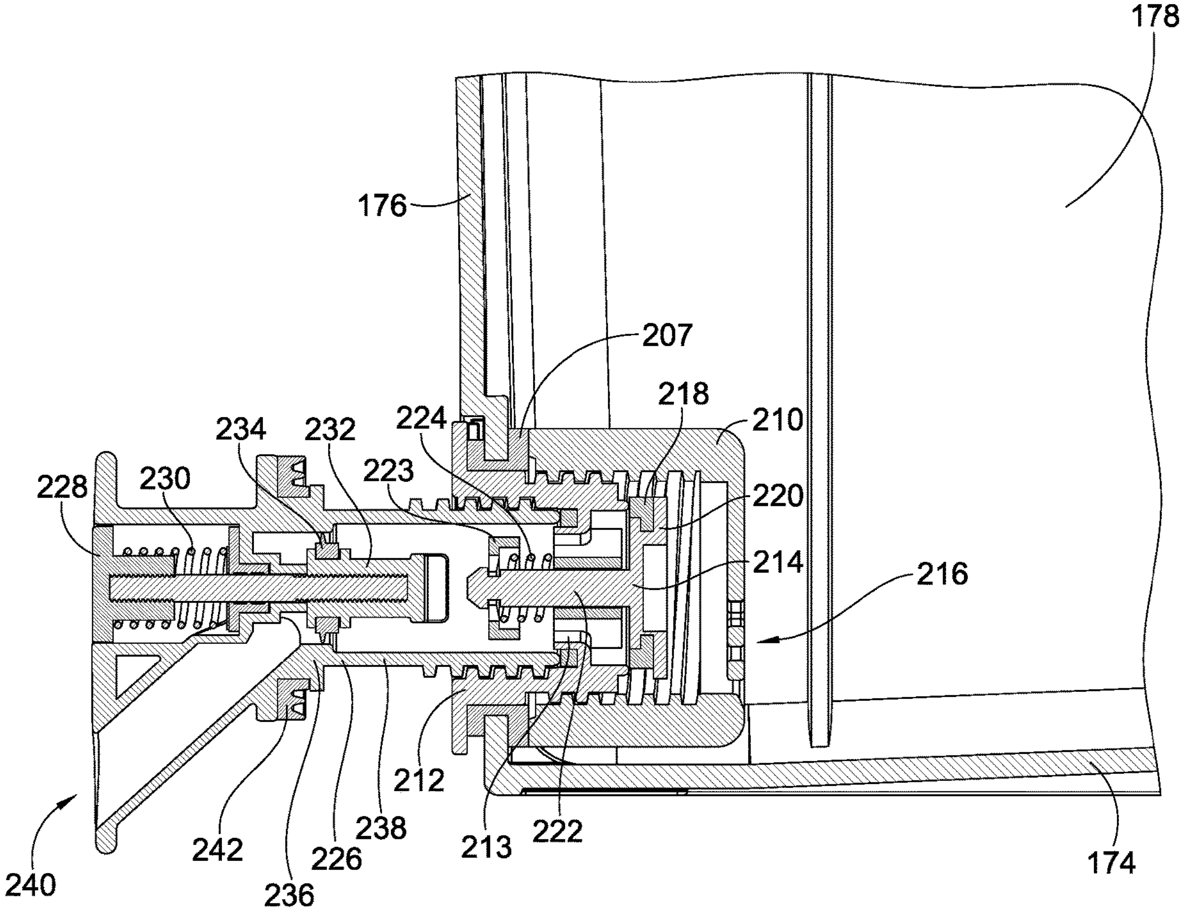
FIG. 27 depicts a cross section detail view of the spigot assembly coupled to the liquid container, in accordance with aspects hereof.

As seen in FIGS. 17 and 18, proximate the opening 186 in the container 172 is an alignment guide 209. The alignment guide 209 is configured to only permit the spigot assembly 82 to couple to the container 172 in a way that results in the desired orientation (e.g., such as that shown in the accompanying figures). Turning to FIG. 27, a cross-section of the spigot assembly 82 coupled to the container 172 is shown. A gasket 207 may be coupled to the container 172 at the opening 186 to provide a tight seal. Pressing the gasket 207 against an inner and outer side of the front sidewall 176 is a bushing. The bushing shown in the accompanying figures is a two-part bushing having a first bushing portion 210 positioned on an internal side of the container 172. The first bushing portion 210 may include internal threading and be aligned with the gasket 207 on one end and have an opening 216 on the other end. The opening

216 may be configured to only communicate fluid therethrough to avoid clogging the spigot assembly 82. For example, the first bushing portion 210 may include a grate or a straining portion on the opening 216. Threadably received by the first bushing portion 210 is a part of a second bushing portion 212 that includes external threading thereon. The second bushing portion 212 may extend in part through the opening 186. The second bushing portion 212 may include a flange on an outer side that is aligned with the gasket 207. The first bushing portion 210 and the second bushing portion 212 may be tightened so as to apply a pressure to both sides of the gasket 207 to create a liquid tight seal at the opening 186.

The second bushing portion 212 may include an outer opening opposite an inner opening. The inner opening may be in communication with the internal portion of the first bushing portion 210. The second bushing portion 212 may include internal threading that begins proximate the outer opening and terminates proximate a stopping flange 213. Between the stopping flange 213 and the terminal end of the internal threading may be a sealing member (e.g., an O-ring, a D-ring, etc.). Also present in the second bushing portion 212 is a self-sealing stem valve 214. The self-sealing stem valve 214 may include a stem body 222, a head 220, and a sealing member 218 coupled to an outer perimeter of the head 220, a foot 223 affixed to the stem body 222, and a bias member 224 coupled to the stem body 222 between the foot 223 and the stopping flange 213. The bias member 224 (e.g., a spring) may urge the head 220 and the sealing member 218 to a sealed position where the head 220 and the sealing member 218 prevent fluid communication between the internal portion the first bushing portion 210 and the inner opening of the second bushing portion 212.

Assembling the spigot assembly 82 to this point is sufficient to seal the container 172 and hold a liquid therein. In some aspects, it is preferable to fill the container 172 prior to fully coupling the spigot assembly 82 thereto. For example, some liquids may be chilled prior to being used with the insulated container 10, such as with a refrigerator. Notably, as will be described below, the remainder of the spigot assembly 82 can also be coupled to the two-part bushing without having to couple the container 172 to the insulated container 10. In other words, the container 172 is also useful outside of the insulated container 10 to dispense liquids held therein.

The spigot assembly 82 also comprises a cannula 226 having external threading. The cannula 226 may include a first opening proximate a terminal end of the external threading. The cannula 226 may be threadably received by the second bushing portion 212 such that the first opening of the cannula 226 is proximate the stopping flange 213. Thus, when the self-sealing stem valve 214 is in an open configuration, the cannula 226 is in communication with the first bushing portion 210, and therefore also with the container 172. The cannula 226 includes a first chamber 238 having a first diameter and a second chamber 236 having a second diameter, the first diameter being greater than the second diameter. The first chamber 238 extends away from the first opening in the cannula 226 to the second chamber 236. The second chamber 236 continues extending away from the first opening in the cannula 226 to a spout opening. The second chamber 236 is in communication with the spout opening. The spout opening is in communication with a spout 240 having an external opening at a distal end thereof.

The cannula 226 also may comprise a plunger 232 configured to move between a retracted position and an extended position. The plunger 232 may be coupled to a push rod 228 slidably mounted in a spigot head. In some aspects, the plunger 232 and the push rod 228 may be concentrically aligned with the stem body 222 of the self-sealing stem valve 214. A biasing member 230 (e.g., a spring) may urge the push rod towards the retracted position. The plunger 232 may also include a second sealing member 234 (e.g., an O-ring, a D-ring, etc.) coupled to an intermediate point. The intermediate point may be aligned with a portion of the second chamber 236 and the second sealing member 234 may have a diameter greater than the second diameter but less than the first diameter. Thus, the second sealing member 234 may prevent fluid communication from the first chamber 238 to the second chamber 236 when the plunger 232 is in the retracted position. Thus, the spigot assembly 82 has a backup seal should the self-sealing stem valve 214 fail (e.g., component fatigue, jamming, etc.).

In operation, the spigot assembly 82 is self-tapping in that it only permits fluid to communicate from the container 172 through the two-part bushing, the cannula 226, and out the spout 240 when both the second sealing member 234 and the stem valve 214 are actuated by a user. Thus, when it is desired to pour a liquid from the container 172, a user depresses the push rod 228 moving the plunger 232 from the retracted position to the extended position. When in the extended position a distal end of the plunger 232 contacts the stem body 222 of the self-sealing stem valve 214 and moves it to the unsealed position. When in such positions, the liquid stored in the container 172 may flow through the opening 216 in the first bushing portion 210, around the head 220 of the self-sealing stem valve 214 and into the first chamber 238 of the cannula 226. When the push rod 228 is depressed, the intermediate point at which the second sealing member 234 is positioned lies within the first chamber 238. As a result, an annular space is present between the second sealing member 234 and the wall of the first chamber 238, through which the liquid is communicated. The liquid continues to flow in the annulus around the push rod 228 into the second chamber 236 and then into the spout 240 until it is dispensed externally from the spigot assembly 82.

Figure 28:
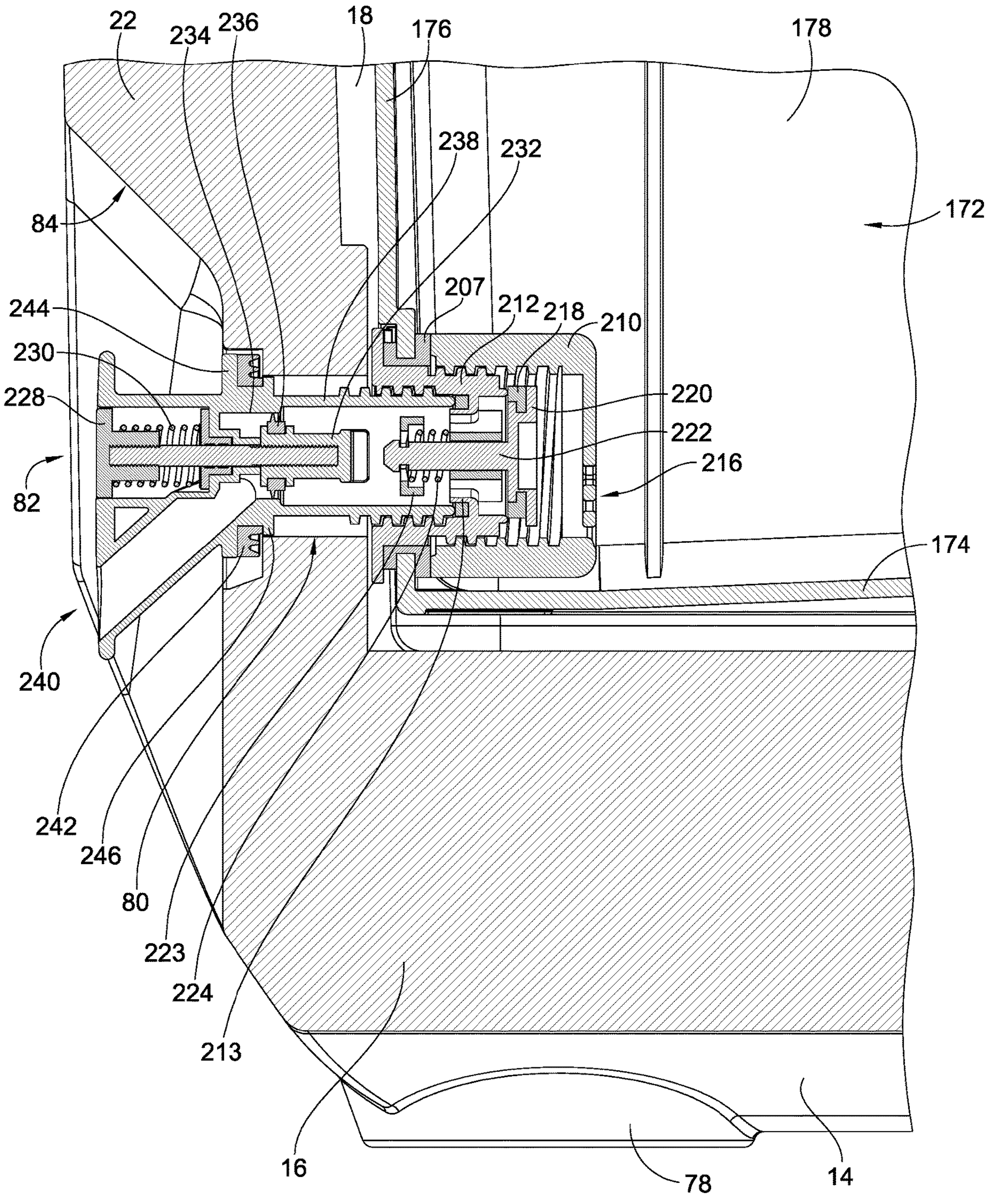
FIG. 28 depicts a cross section detail view of the spigot assembly received through a portion of the insulated container of FIG. 1 and coupled to the liquid container, in accordance with aspects hereof.

Turning to FIG. 28, a cross-section depicts the insulated container 10 having the container 172 received in the internal chamber 26 and the spigot assembly 82 extending through the passageway 80 and coupled to the container 172. This figure depicts substantially the same features as FIG. 27, but now includes the insulated container 10. Thus, the above description of how the spigot assembly 82 couples to the container 172 is also applicable here but will not be repeated for sake of brevity. Thus, when coupling the spigot assembly 82 to the container 172, the above description through coupling of the two-part bushing applies here.

After the two-part bushing is coupled to the container 172, the container 172 may be coupled to the left-side projected panel 56 within the internal chamber 26 of the base structure 14. Next, the cannula 226 may be inserted through the passageway 80 and threadably coupled to the two-part bushing, as described above. When the cannula 226 is threadably received, a flange 244 on an external portion of the cannula 226 and a third sealing member 242 are positioned adjacent to, and make contact with, a portion of the front wall 22. The flange 244 and the third sealing member 242 seal the passageway.

A second flange 246 positioned inward of the flange 244 and on the opposite side of the third sealing member 242 also extends radially out from the cannula 226. The second flange 246 is received within the passageway 80 when the cannula 226 is threadably received. The second flange 246 provides radial support to the cannula 226 when received through the passageway 80 and helps provide a seal to the passageway 80.

Figure 29:
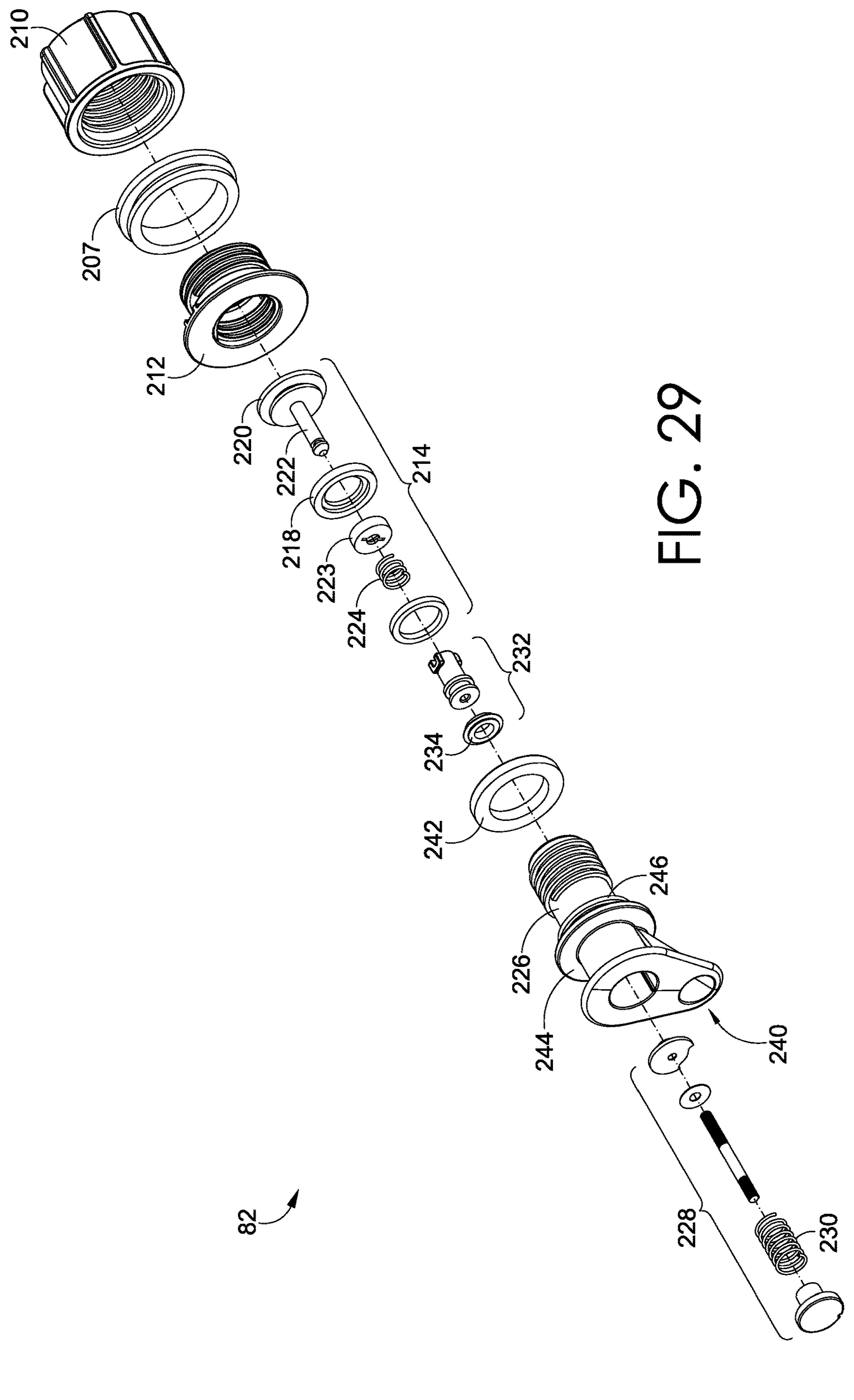
FIG. 29 depicts an exploded view of the spigot assembly of FIG. 27, in accordance with aspects hereof.

Turning to FIG. 29, an exploded view of the spigot assembly 82 is shown. From right-to-left, the spigot assembly 82 may include the first bushing portion 210, the gasket 207, the second bushing portion 212, and the self-sealing stem valve 214. The stem valve 214 may include the sealing member 218, the head 220, the stem body 222, the foot 223, the bias member 224, and a sealing member (unlabeled). The spigot assembly 82 may also include a cannula 226 having a flange 244 extending radially outward therefrom, a second flange 246 also extending radially outward therefrom, a third sealing member 242 positioned between the flange 244 and the second flange 246, a push rod 228 having a biasing member 230 and coupled to a plunger 232 having a second sealing member 234.

Figure 30:
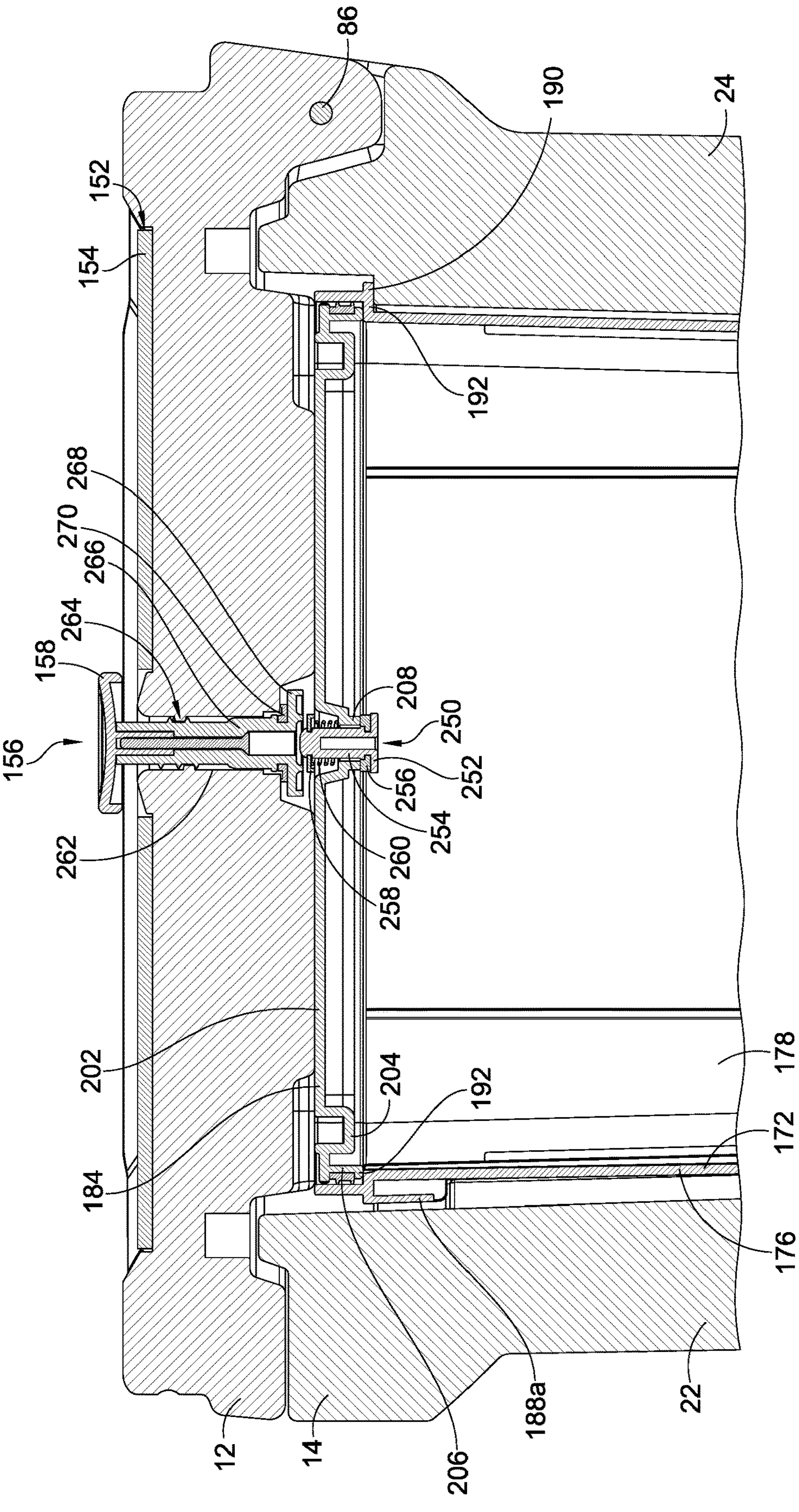
FIG. 30 depicts a cross section view of a snorkel in an extended position to prevent venting of the insulated container of FIG. 1 or the liquid container of FIG. 18, in accordance with aspects hereof.
Figure 31:
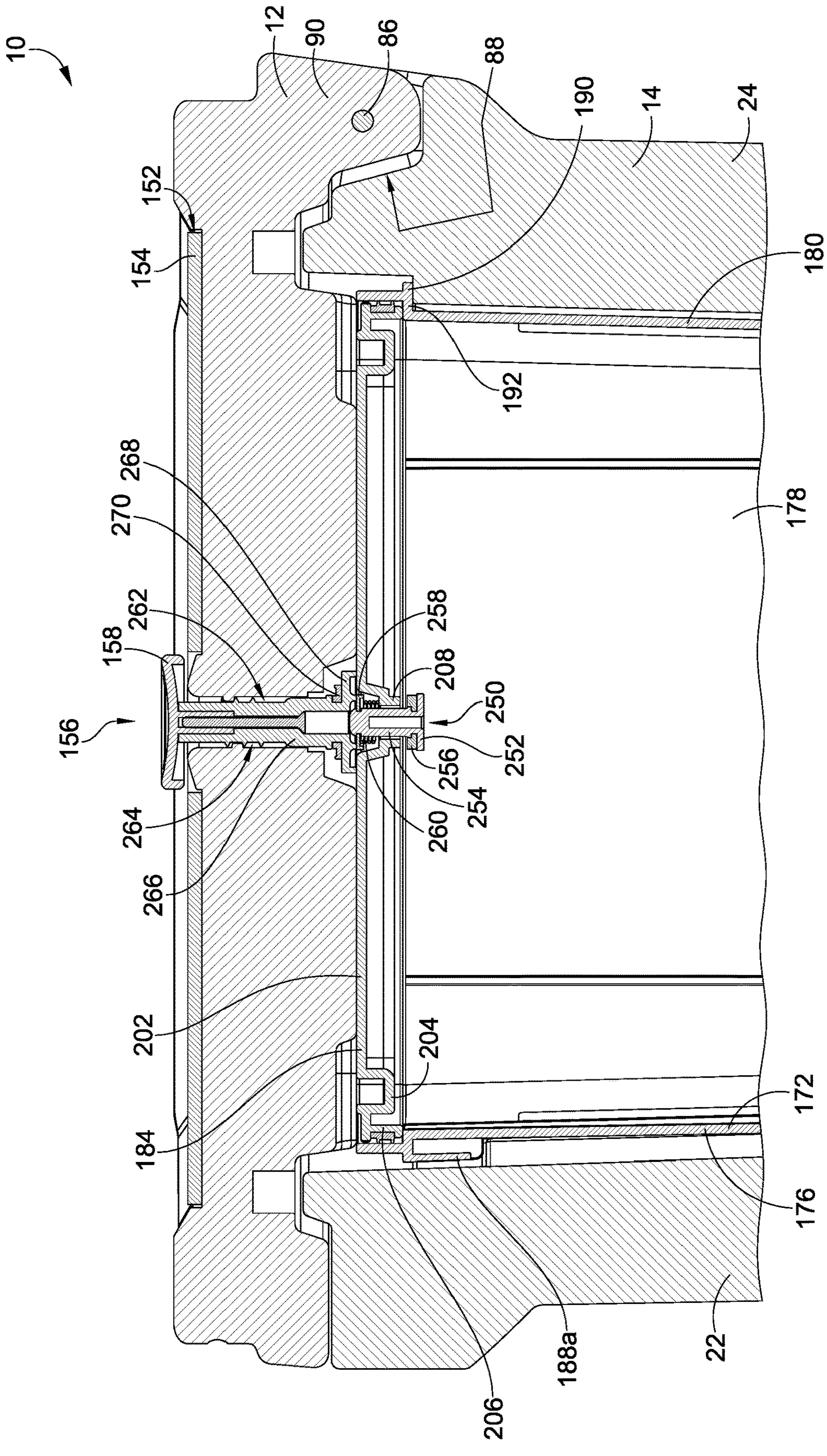
FIG. 31 depicts a cross section view of the snorkel of FIG. 30 in a retracted position to permit venting of the insulated container of FIG. 1 or the liquid container of FIG. 18, in accordance with aspects hereof.

Depicted in FIGS. 30 and 31 is an insulated container 10 having a container 172 positioned in an internal chamber 26. Coupled to the container 172 is a lid 184. The lid 184 includes a vent opening 208. Received through the vent opening 208 is a stem valve 250. Stem valve 250 may include a head portion 252, a stem 254 extending upwards from the head portion 252, a sealing member 256 (e.g., an O-ring, a D-ring, etc.) surrounding the stem 254 and coupled to the head portion 252. The head portion 252 and the sealing member 256 configured for sealing the vent opening 208 when in a sealing position. Opposite the head portion 252, a foot portion 258 is coupled to the stem 254. Between the foot portion 258 and a surface of the lid 184 is a biasing member 260 (e.g., a spring). The biasing member 260 urges the stem valve 250 into the sealing position. As depicted, the biasing member 260 raises the foot portion 258 and thus the stem 254, and therefore the head portion 252 and the sealing member 256 so that the sealing member 256 and the head portion 252 seal the vent opening 208. On the other hand, when the foot portion 258 and/or the stem 254 are depressed, then the head portion 252 and the sealing member 256 are moved to an unsealed position and fluid communication is possible through the vent opening 208.

Also shown in FIGS. 30 and 31 is a cross-section of the snorkel 156. As discussed above, the snorkel 156 moves between a retracted position and an extended position (relative to the lid structure 12) through an air passage 262. The air passage 262 extends through the lid structure 12 and includes threading on a wall 264. The snorkel 156 comprises the knob 158 coupled to a tube 266. The tube 266 may include an inner flange 268 on an opposite end from the knob 158. A sealing member 270 (e.g., an O-ring, a D-ring, etc.) may extend around the tube 266 and be positioned adjacent the inner flange 268. The tube 266 may also include external threading. Thus, the tube 266 may be threadably received in the air passage 262.

When the snorkel 156 is in the extended position, the inner flange 268 holds the sealing member 270 against a surface of the lid structure 12 and seals the air passage 262, as shown in FIG. 30. When the snorkel 156 is in the retracted position, the inner flange 268 and the sealing member 270 moved away from the surface of the lid structure 12 and the air passage 262 becomes unsealed. When unsealed, fluid (e.g., air) may flow through the an annulus present in the air passage 262. Further, slots formed in various portions of the snorkel 156 (e.g., the knob 158, the tube 266, etc.) ensure fluid may pass from outside the insulated container 10 to inside the internal chamber 26.

In the illustrated aspect, when the tube 266 is in the retracted position the inner flange 268 contacts one or more of the stem 254 and the foot portion 258 of the stem valve 250 and moves the stem valve 250 to the unsealed position. Thus, when liquid is to be dispensed from the container 172, it may be desirable to move the snorkel 156 to the retracted position to cause the stem valve 250 to open and allow air to pass through the vent opening 208 and enter the container 172. Venting of the container 172 in this way may reduce, or prevent, chugging while dispensing liquid through the spigot assembly 82. When not dispensing liquid from the container 172, it may be desirable to move the snorkel 156 to the extended position to provide a better thermal barrier to the insulated container 10.

Figure 32:
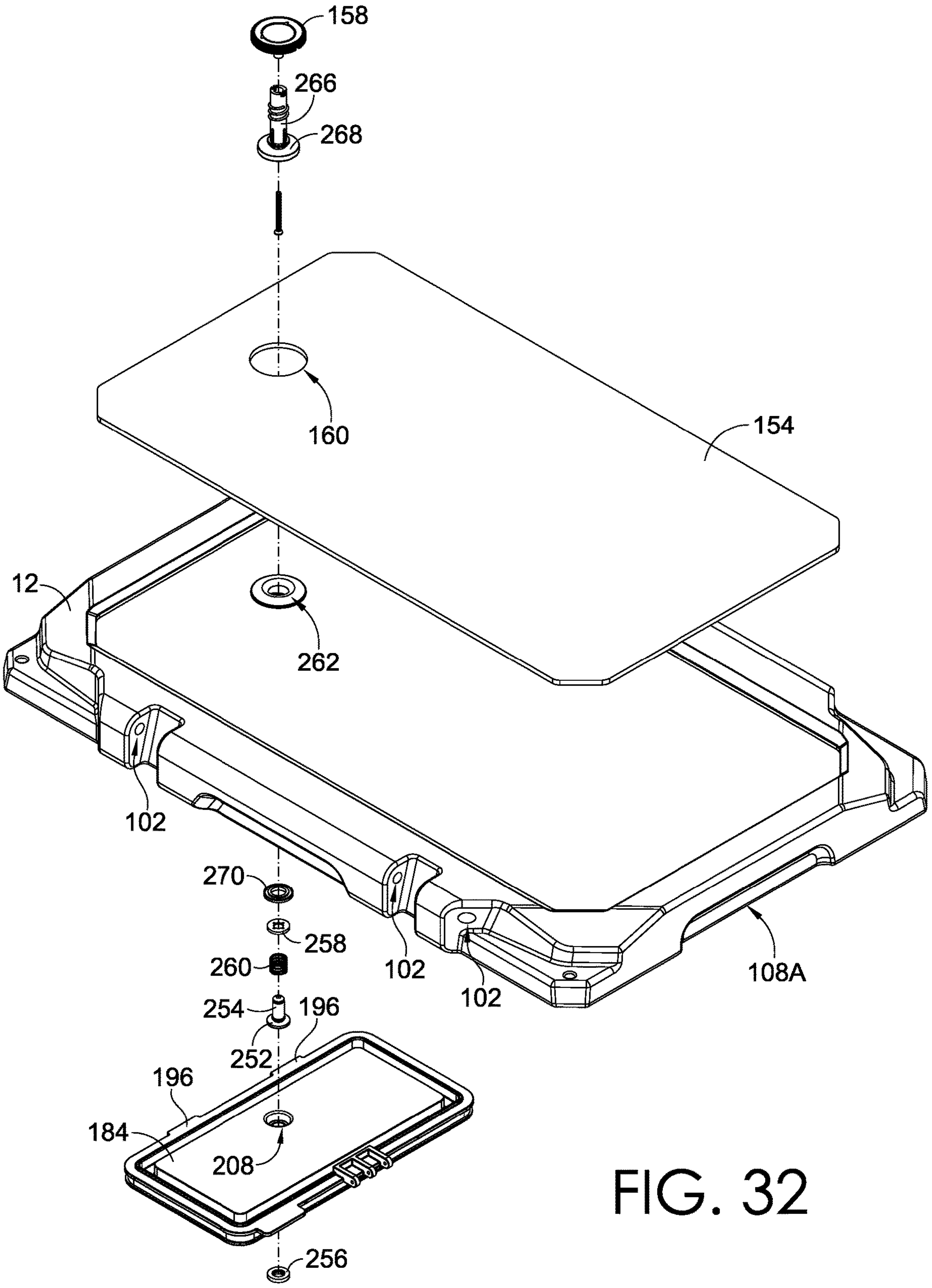
FIG. 32 depicts an exploded view of the snorkel of FIG. 30 and a stem valve in relation to a lid structure of the insulated container of FIG. 1 and a lid of the liquid container of FIG. 18, in accordance with aspects hereof.

Referring to FIG. 32, depicted is an exploded view of the lid 184, the stem valve 250, the lid structure 12, and the snorkel 156.

Additionally, although some exemplary implementations of the embodiments described herein are shown in the accompanying figures, these implementations are not intended to be limiting. Rather, it should be understood that the various embodiments and aspects described herein may be implemented upon any insulated container.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A liquid dispensing cooler comprising:

a cooler base structure coupled to a cooler lid structure, wherein the cooler base structure and the cooler lid structure enclose an interior cooler volume, the cooler base structure having a perimeter edge around an opening, a bottom surface opposite the opening, and an intermediate surface positioned between the bottom surface and the perimeter edge;

the cooler base structure having a set of wheels rotatably coupled to the cooler base structure along a defined axis of rotation extending through the cooler base structure at a first end, and a ground contacting portion rigidly coupled to the cooler base structure at a second end opposite the first end and configured to engage a surface beneath the cooler base structure;

a container removably positioned within the interior cooler volume, the container having a lip extending outwardly from the container such that when the container is removably positioned within the interior cooler volume the lip engages the intermediate surface to suspend the container above the bottom surface of the cooler base structure; and a spigot extending through the cooler base structure and removably coupled to the suspended container, the spigot being configured to communicate liquid from the suspended container out of the cooler, wherein the spigot is positioned about four inches to about six inches above the ground contacting portion.

2. The liquid dispensing cooler of claim 1 further comprising a two-part bushing coupled to the container at a container opening, wherein the spigot is threadably coupled with the two-part bushing.

3. The liquid dispensing cooler of claim 1 further comprising a debossed well on a surface of the cooler base structure around the spigot, wherein the debossed well has a depth that is longer that a length of the spigot.

4. The liquid dispensing cooler of claim 1, wherein the ground contacting portion comprises a pair of feet extending from the cooler base structure.

5. The liquid dispensing cooler of claim 1, wherein the spigot extends through a front side of the cooler base structure.

6. The liquid dispensing cooler of claim 5, wherein the spigot extends into the interior cooler volume proximate one side of the interior cooler volume.

7. The liquid dispensing cooler of claim 6, wherein a drain port extends through a sidewall of the cooler base structure and is configured to communicate fluid out of the interior cooler volume.

8. The liquid dispensing cooler of claim 7, wherein the spigot is associated with an opposite side of the interior cooler volume from the drain port.

9. The liquid dispensing cooler of claim 1, the container having a lid.

10. The liquid dispensing cooler of claim 9, wherein the lid comprises a vent opening.

11. The liquid dispensing cooler of claim 1, wherein the container comprises a bottom wall and a spigot opening proximate the bottom wall, wherein the spigot is removably coupled to the spigot opening of the suspended container.

12. The liquid dispensing cooler of claim 11, wherein the container comprises at least one flange positioned beneath the lip, and wherein the intermediate surface of the cooler base structure comprises at least one notch adapted to receive a corresponding flange of the at least one flange.

13. The liquid dispensing cooler of claim 12, wherein the spigot extends through a passageway of the cooler base structure, and wherein the passageway and the spigot opening are concentrically aligned when the container is removably positioned within the interior cooler volume.

14. A liquid dispensing cooler comprising:

a cooler base structure coupled to a cooler lid structure, wherein the cooler base structure and the cooler lid structure define an interior cooler volume when in a closed position, the cooler base structure having a perimeter edge around an opening, a bottom surface opposite the opening, an intermediate surface positioned between the bottom surface and the perimeter edge, a set of wheels rotatably coupled to the cooler base structure along a defined axis of rotation extending through the cooler base structure at a first end, and a ground contacting portion rigidly coupled to the cooler base structure at a second end opposite the first end and configured to engage a surface beneath the cooler base structure;

a container removably positioned within the interior cooler volume, the container having a lip extending outwardly from the container such that when the container is removably positioned within the interior cooler volume the lip engages the intermediate surface to suspend the container above the bottom surface of the cooler base structure; and a spigot removably coupled to the suspended container and extending through the cooler base structure, the spigot being configured to communicate liquid from the suspended container out of the cooler, wherein the spigot is positioned about four inches to about six inches above the ground contacting portion.

15. The liquid dispensing cooler of claim 14, further comprising a dispensing well that is debossed relative to a surface of the cooler base structure around the spigot.

16. The liquid dispensing cooler of claim 15, wherein the dispensing well has a depth that is longer that a length of the spigot.

17. The liquid dispensing cooler of claim 16, wherein the spigot is recessed within the dispensing well relative to the surface of the cooler base structure so as to not extend beyond the surface.

18. The liquid dispensing cooler of claim 14, wherein the spigot is positioned further from the ground contacting portion than the defined axis of rotation.

19. The liquid dispensing cooler of claim 14, further comprising a two-part bushing coupled to the container at a container opening, wherein the spigot is threadably coupled with the two-part bushing.

20. The liquid dispensing cooler of claim 14, wherein the container comprises a bottom wall and a spigot opening proximate the bottom wall, wherein the cooler base structure comprises a passageway, and wherein the spigot extends through the passageway and is removably coupled to the spigot opening of the suspended container.

* * * * *